US006996132B1

(12) United States Patent
Tolety

(10) Patent No.: US 6,996,132 B1
(45) Date of Patent: Feb. 7, 2006

(54) METHOD, APPARATUS AND PROGRAM FOR DETERMINING AVAILABLE BANDWIDTH BETWEEN MULTIPLE POINTS IN A COMMUNICATION SYSTEM

(75) Inventor: Siva Perraju Tolety, Natick, MA (US)

(73) Assignee: Verizon Laboratories Inc., Waltham, MA (US)

( * ) Notice: Subject to any disclaimer, the term of this patent is extended or adjusted under 35 U.S.C. 154(b) by 1157 days.

(21) Appl. No.: 09/634,484

(22) Filed: Aug. 8, 2000

(51) Int. Cl.
*G01R 31/08* (2006.01)
*H04L 12/28* (2006.01)
*H04J 3/16* (2006.01)
*H04J 3/06* (2006.01)

(52) U.S. Cl. ...................... 370/517; 370/252; 370/401; 370/468

(58) Field of Classification Search ................ 370/241, 370/241.1, 248, 252, 253, 401, 400, 412, 370/466, 517, 468; 709/224, 233
See application file for complete search history.

(56) References Cited

U.S. PATENT DOCUMENTS 5,477,531 A * 12/1995 McKee et al. .............. 370/249
5,881,050 A 3/1999 Chevalier et al. ........... 370/230
6,118,791 A 9/2000 Fichou et al. ............. 370/468
6,195,362 B1 2/2001 Darcie et al. ............... 370/431
6,249,802 B1 6/2001 Richardson et al. ........ 709/200
6,502,131 B1 * 12/2002 Vaid et al. .................. 709/224
6,711,137 B1 * 3/2004 Klassen et al. ............. 370/252

OTHER PUBLICATIONS

Materials from World Wide Web Page(s), Bandwidth Speed Test, at http://www.computingcentral.com/topics/bandwidth/speedtest500.asp, Apr. 18, 2000.

* cited by examiner

*Primary Examiner*—Duc Ho
(74) *Attorney, Agent, or Firm*—Leonard C. Suchyta, Esq.; Joe Wall, Esq.; Fitzpatrick, Cella, Harper, Scinto

(57) ABSTRACT

A method, apparatus (22), and program are provided for determining an amount of bandwidth available in at least a portion of at least one communication path (5, 3, 6, 7, 10-1, 9, 12, 13, 14, 24*a*, 24*b*) coupling a plurality of nodes (1, 15, 22) together. The communication path (5, 3, 6, 7, 10-1, 9, 12, 13, 14, 24*a*, 24*b*) is exercised using information signals, to determine the amount of time it takes for at least one of those information signals to traverse the communication path (5, 3, 6, 7, 10-1, 9, 12, 13, 14, 24*a*, 24*b*) in at least one direction, and the amount of bandwidth available in at least a portion of the communication path (5, 3, 6, 7, 10-1, 9, 12, 13, 14, 24*a*, 24*b*) is determined, based on the amount of time determined in the exercising step. In accordance with another embodiment of the invention, the bandwidth available in both uplink and download directions of the communication path is determined by transferring a file between a test node (22) and a user communication terminal 1, by way of the communication path, and a router (15).

65 Claims, 8 Drawing Sheets

METHOD, APPARATUS AND PROGRAM FOR DETERMINING AVAILABLE BANDWIDTH BETWEEN MULTIPLE POINTS IN A COMMUNICATION SYSTEM

BACKGROUND OF THE INVENTION

1. Field of the Invention

This invention relates generally to communication systems, and in particular to a method, apparatus and program for determining available bandwidth in a communication path coupled between nodes in a communication system.

2. Related Art

Internet connection service providers typically promise customers that they will be provided with specific bandwidth rates for particular types of service connections (e.g., ADSL, xDSL, ISDN, etc.). Despite these promises, however, at any given time, actual bandwidth rates may differ substantially from promised bandwidth rates, owing to, for example, the presence of severe traffic congestion in communication system components and system component capacity limitations. As a result, connection service providers often receive many complaints from customers concerning long download delays, problems encountered during Packet Internet Groper (PING) operations, and other complaints relating to bandwidth reductions in general.

To respond to these problems, connection service providers often employ known test procedures for isolating problem system components. Unfortunately, most known test procedures are unsatisfactory in that they test only components interposed between customer premise and central office switching equipment, but do not test upstream system components. An example of one such test procedure is the Fujitsu Speed Port Shelf Manager, which enables troubleshooters to conduct bit error rate (BER) tests, noise margin estimates, errored seconds (ER) and severe errored seconds (SER) estimates, and attenuation estimates.

At least some connection service providers respond to customer complaints concerning low bandwidth rates by terminating existing virtual circuits connecting customer premise equipment to backbone cloud (network) equipment, such as a network (e.g., Frame Relay) switch, and by then "rebuilding" other virtual circuits to couple the customer premise equipment to a test server through another switch in the network. This step is necessary because, during normal, non-testing conditions, the test server and customer premise equipment are typically connected to different switches, and thus are not communicatively coupled together. A file having a predetermined size is then downloaded from the test server to the customer premise equipment by way of the rebuilt virtual circuit. The customer premise equipment then measures (using a program) the period of time taken for the file to be received therein, by, for example, detecting receipt times of beginning and ending portions (e.g., Start-of-File and End-of-File, respectively) of the file, and by then calculating the difference between those receipt times. The customer premise equipment also determines the size of the downloaded file by counting each byte included in the file, as it is received in the customer premise equipment, and by then multiplying the total number of counted bytes by '8' to determine the total number of bits included in the file. Thereafter, an estimate is made of the file download rate (i.e., the downlink bandwidth rate), based on the measured download time period and the determined file size.

Unfortunately, however, the foregoing prior art test procedure has a number of drawbacks. One drawback is that the "rebuilt" virtual circuit is not necessarily the same original virtual circuit used during normal, non-testing conditions, and thus the bandwidth rate determined during the test may be an inaccurate estimation of the typical bandwidth provided to the customer premise equipment. Also, the test procedure does not provide any indication of the uplink bandwidth rate and the system components which may be causing the bandwidth reduction problem. Moreover, the test procedure requires intensive operator intervention for rebuilding the virtual circuit, rendering the procedure susceptible to human-induced errors. Furthermore, owing to possible manpower limitations and associated costs, it might not be feasible to perform such a procedure on a large scale, especially where the customer base being supported is a large one.

At least one known bandwidth estimation technique enables customers to conduct a download bandwidth test using off-the-shelf software (see, for example, the "Bandwidth Speed Test" provided at http://www.computingcentral.com/topics/bandwidth/speed test500.asp). This technique apparently is performed using a large Hyper Text Markup Language (HTML) page, wherein a Javascript code in the page determines starting and ending times of a transfer of a portion of the page, for use in determining the download bandwidth. Unfortunately, because browser software is employed to determine the starting and ending times of the page transfer, the technique is subject to browser idiosyncrasies which can reduce the accuracy of the downlink bandwidth determination (different browser software may provide different bandwidth estimates). The technique also requires the use of customer premise equipment software which can understand the HyperText Transfer Protocol (HTTP). This can further reduce the accuracy of the bandwidth determination, especially in cases where the customer premise equipment software gives low priority to processing HTTP-related requests. Moreover, the technique does not provide any estimate of the uplink bandwidth.

There is a need, therefore, for an improved technique which reliably determines an amount of bandwidth available in a communication path coupling together nodes in a communication system, and does not suffer from the drawbacks discussed above.

SUMMARY OF INVENTION

It is a first object of this invention to provide an improved method, apparatus, and program for determining an amount of bandwidth available in at least a portion of a communication path coupling together nodes in a communication system.

It is another object of this invention to determine an amount of bandwidth available between multiple points in a communication system, at a single node in the communication system.

Further objects and advantages of this invention will become apparent from a consideration of the drawings and ensuing description.

The foregoing and other problems are overcome and the objects of the invention are realized by a method for determining an amount of bandwidth available in at least one communication path which couples a plurality of nodes together, and a program and apparatus that operate in accordance with that method. In accordance with one embodiment of the invention, the method comprises steps of exercising the communication path, using information signals, to determine the amount of time it takes for at least one of those information signals to traverse the path in at least one direction, and determining the amount of bandwidth available in at least a portion of the path, based on the amount of time determined in the exercising step.

A first one of the plurality of nodes preferably comprises a router located at a Point of Presence of an Internet Service Provider (ISP), and a second one of the plurality of nodes preferably comprises a user communication terminal (customer premise equipment). Those nodes are coupled together through components of a communication system forming the communication path.

In accordance with another embodiment of this invention, uplink and downlink bandwidth rates available in the communication path are determined by transferring a file between a test node and the user communication terminal, by way of the at least one communication path and a router. The uplink and downlink bandwidth rates are then calculated based on the file size, a rate at which the file is received at the terminal, and a rate at which the file is received at the test node, respectively.

BRIEF DESCRIPTION OF THE DRAWINGS

The present invention will be more readily understood from a detailed description of the preferred embodiments taken in conjunction with following figures.

Identical portions of the various figures have been identified with the same reference numerals in order to simplify the description of the invention.

DETAILED DESCRIPTION OF THE PREFERRED EMBODIMENTS

Figure 1:
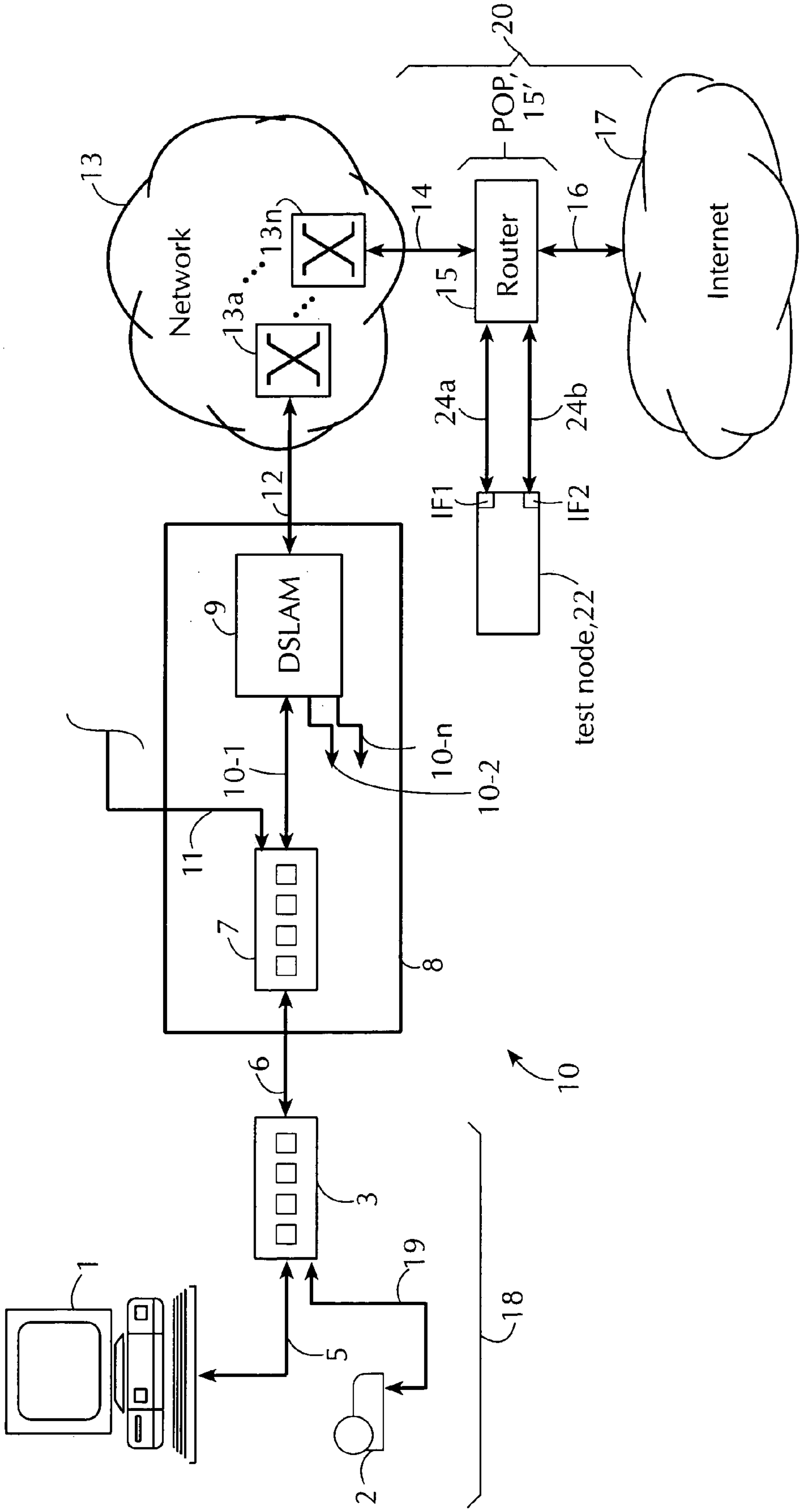
FIG. 1 is a block diagram of a communication system 10 that includes a test node 22 constructed and operated according to this invention.

FIG. 1 is a block diagram of a communication system 10 that is suitable for practicing this invention. In the illustrated embodiment, the communication system 10 comprises client premise equipment (CPE) 18, a central office switching station 8, a communication network 13, and a communication interface 20 for coupling the communication network 13 to a communication network entity 17, such as the Internet. In accordance with this invention, the communication system 10 also comprises a test node (hereinafter also referred to as a "user communication terminal") 22 which is bidirectionally coupled to a node 15 (to be described below) of the interface 20, through each of a plurality of communication links 24*a* and 24*b*.

The CPE 18 is bidirectionally coupled to transceiving equipment 7 of the central office switching station 8 through a communication interface 6, such as a telephone line (e.g., landline trunk), although in other embodiments, other suitable types of interfaces may also be employed for that interface 6, such as one or more coaxial cable lines, or a wireless interface. A multiplexer/demultiplexer device 9 of the central office switching station 8 is bidirectionally coupled to the network 13 through a communication interface 12, which, in the preferred embodiment, includes a T1 or T3 high speed link, although in other embodiments, other suitable types interfaces also may be employed between those components 9 and 13, such as, for example, a wireless or other interface, depending on applicable system architecture.

The test node 22 according to this invention includes a plurality of interfaces (IF1) and (IF2) that are each coupled to the node 15 of communication interface 20 through a respective one of the bidirectional communication links 24*a* and 24*b*. Preferably, the test node 22 includes a PC or a server computer, each interface (IF1) and (IF2) includes a network interface card (NIC1 and NIC2, respectively) having a unique, pre-assigned IP address (i.e., the test node 22 is a "multi-homed" device), and the links 24*a* and 24*b* each include a high-speed link, such as a T1 or T3 link. Preferably, the links 24*a* and 24*b* do not support any other traffic other than that provided between the node 22 and router 15, and thus each link 24*a* and 24*b* has a same, known available bandwidth capacity. The internal construction of the test node 22 and the manner in which that test node 22 is employed in the invention will be described in more detail below. The CPE 18 shown in FIG. 1 will now be described. In the illustrated embodiment, the CPE 18 includes transceiving equipment 3 and one or more user communication terminals, such as, for example, a PC 1 and a telephone 2, that are bidirectionally coupled to the transceiving equipment 3 through respective communication interfaces 5 and 19. Preferably, the transceiving equipment 3 includes an Asynchronous Digital Subscriber Line (ADSL) modem, although in other embodiments, other suitable types of transceiving equipment may also be employed, such as, for example, an XDSL modem, an Integrated Services Digital Network (ISDN) modem, a cable modem (and/or a cable converter or set top box), wireless transceiving equipment, and the like, depending on, for example, applicable performance criteria and the types of user communication terminals 1 and 2 employed. In the preferred embodiment, the ADSL modem 3 operates by modulating voice signals and data received from the respective devices 2 and 1, using a known ADSL modulation technique (such as, e.g., Discrete Multitone Technology (DMT), Carrierless Amplitude Modulation (CAP), or Multiple Virtual Line (MVL) technique, etc.), and by forwarding resulting modulated information to the switching station 8 by way of interface 6. The modem 3 also operates by demodulating information received over the interface 6, using a known ADSL demodulation technique (e.g., DMT, CAP, or MVL techniques, etc.), and by separating voice signals from data included in the received information using, for example, an associated splitting device (e.g., a POTS splitter) (not shown). The separated voice signals and data are then forwarded to the respective devices 2 and 1, through the corresponding interfaces 19 and 5, each of which may include, for example, a telephone line, cable line, or a wireless interface, depending on the types of user communication terminals 1 and 2 employed.

Figure 2:
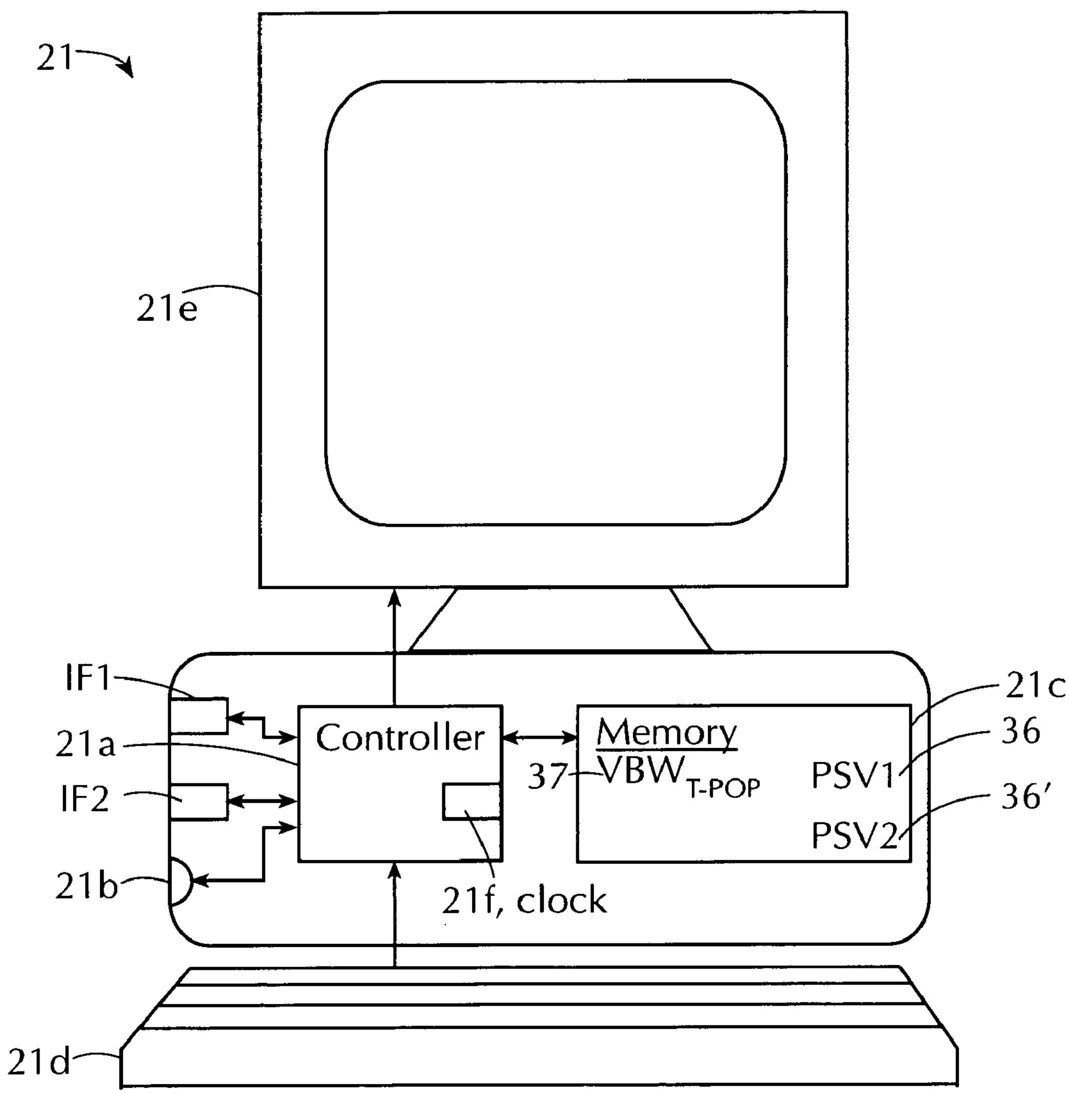
FIG. 2 is a block diagram of a user communication terminal 21 representing in further detail the test node 22 and a user communication terminal 1 of the system 10 of FIG. 1.

Referring now to FIG. 2, a preferred embodiment of the test node 22 (also referred to as a "user communication terminal"), and an exemplary embodiment of the user communication terminal 1, are shown, and are each identified by reference numeral 21. In FIG. 2, user communication terminal 21 preferably comprises a controller (e.g., a microprocessor and/or logic array) 21*a* for performing arithmetic and/or logical operations required for program execution, at least one input user-interface 21*d* that is coupled to the controller 21*a*, and at least one output user-interface 21*e* that also is coupled to the controller 21*a*. In the case of the user communication terminal 22 (i.e., the test node 22 of FIG. 1), the controller 21*a* is bidirectionally coupled to each of the interfaces (IF1) and (IF2) (i.e., NIC1 and NIC2, respectively), and can communicate bidirectionally through each one of those interfaces and the corresponding link 24*a*, 24*b* (FIG. 1) coupled thereto. In the case of the user communication terminal 1 (of FIG. 1), one or more ports 21*b* are provided for enabling the controller 21*a* of that terminal 1 to communicate bidirectionally with the modem 3 through those port(s) 21*b* and the link 5.

The input user-interface 21*d* may include any suitable type of user-operable input device(s), such as, for example, a keyboard, mouse, touch screen, or trackball, and the output user-interface 21*e* may include, for example, a video display, a liquid crystal or other flat panel display, a printer, a speaker, and/or any other suitable type of output device for enabling a user to perceive outputted information. For the purposes of this description, the output user-interface 21*e* is assumed to be a display.

The user communication terminal 21 of FIG. 2 also includes at least one memory (e.g., disk drives, read-only memories, and/or random access memories) 21*c* that is bidirectionally coupled to the controller 21*a*. The memory 21*c* stores temporary data and instructions, and also stores various routines and operating programs (e.g., Microsoft Windows, UNIX/LINUX, or OS/2) that are used by the controller 21*a* for controlling the overall operation of the user communication terminal 21. Preferably, at least one of the programs (e.g., Microsoft Winsock) stored in memory 21*c* adheres to TCP/IP protocols (i.e., includes a TCP/IP stack), for implementing a known method for connecting the terminal 21 to the Internet 17, through the various intermediate components of the system 10. The memory 21*c* may also store web browser software, such as, for example, Microsoft Internet Explorer (IE) and/or Netscape Navigator, for enabling a user of the terminal 21 to navigate or otherwise exchange information with the World Wide Web (WWW). The memory 21*c* of test node 22 also stores routines for implementing a method according to one embodiment of this invention. That method will be described below in relation to FIGS. 3*a*–3*c*. In accordance with another embodiment this invention, both the user communication terminal 1 and the test node 22 store routines for implementing another method of the invention, which will be described below in relation to FIG. 7.

Before describing the further components of the communication system 1, it should be noted that although this invention is described in the context of the test node 22 and user communication terminal 1 of FIG. 1 each being embodied as a PC (or, in the case of test node 22, a server computer), any other suitable type of user communication terminal may be employed for those devices 1 and 22, and the CPE 18 may include other user communication terminals, in addition to those depicted in FIG. 1. For example, in other embodiments, the individual devices 1 and 22 each may be embodied as a portable PC docking node, a web TV, personal digital assistant, handheld personal digital assistant, palmtop computer, cellular radiotelephone, or pager, and the like, and/or the CPE may include one or more of those devices in addition to the devices 1 and 2 shown in FIG. 1. Moreover, the total number and variety of user communication terminals that may be included in the CPE and the overall communication system 10 in general can vary widely, depending on user support requirements, geographic locations, and applicable design/system operating criteria, etc., and are not limited to those depicted in FIG. 1. In general, the teaching of this invention may be employed in conjunction with any suitable types of communication terminals that are capable of communicating with a communication system/network that communicates in accordance with a communication protocol, such as TCP/IP. It should thus be clear that the teaching of this invention is not to be construed as being limited for use with any particular type of communication terminal or communication protocol.

It also should be noted that, although the equipment 3 and 7 is shown in FIG. 1 as being separate components of the CPE 18 and station 8, respectively, in other embodiments, that equipment may be located within other components of the CPE 18 and station 8. For example, the modem 3 may be located internally within the housing of the user communication terminal 1, and/or the modem 7 may form an integral part of one of the other components of switching station 8.

Referring again to FIG. 1, the components of the central office switching station 8 will now be described. According to a preferred embodiment, the switching station 8 comprises the transceiving equipment 7 and the multiplexer/demultiplexer device 9. Like the equipment 3, the transceiving equipment is preferably an ADSL modem (e.g., ATU-C), and operates in a similar manner as the equipment 3 described above, by demodulating information received from the CPE 18 through link 6 (using, e.g., a known ADSL demodulation technique), and by separating voice signals from data in the received information, using, for example, an associated splitting device (e.g., a POTS splitter) (not shown). The separated data is then forwarded to the multiplexer/demultiplexer device 9 via a link 10-1, and the separated voice signals are forwarded through a communication link 11 to a PSTN (not shown) for subsequent transmission to a particular receiving destination. The modem 7 also operates by modulating voice signals and data received over the respective links 11 and 10-1, using a known ADSL modulation technique, and by forwarding resulting modulated information to the CPE 18 by way of interface 6.

The multiplexer/demultiplexer device 9 of switching station 8 preferably includes a Digital Subscriber Line Access Multiplixer/Demultiplexer (DSLAM), although in other embodiments, such as those not employing ADSL technology, any other suitable type of multiplexer/demultiplexer device may also be employed. In the preferred embodiment, the multiplexer/demultiplexer 6 operates by coupling signals received over links 10-1 to 10-*n* onto the communication interface 12, using a known multiplexing technique. The coupled signals are then transmitted to the network 13 over that interface 12. The device 9 also operates by demultiplexing signals received from the communication interface 12, using a known demultiplexing technique, and by forwarding resulting demultiplexed signals through respective ones of the links 10-1 to **10-*n*** to respective predetermined destinations.

The communication network 13 shown in FIG. 1 will now be described. The communication network 13 preferably includes one or more switches **13*a*–13*n* that are interconnected by high-speed optical links, such as, e.g., OC-3 (Optical Carrier) links or other types of high speed links such as, e.g., T-1, T-3, DS-1, or DS-3 links, etc. The switches 13*a*–13*n* collectively operate in a known manner by routing information received from the individual communication interfaces 12 and 14 to intended destinations outside of the network 13, based on address information (e.g., IP address information) included in the received information. Preferably, the network 13** operates in accordance with Frame Relay (FR) technology, although in other embodiments, other suitable types of techniques for routing data between particular source and destination points may also be employed, such as Asynchronous Transfer Mode (ATM) technology. As is known in the art, Frame Relay technology is a packet-switching protocol for transmitting intermittent traffic between networks (e.g., LANs or WANs) and between end points in a communication system. Frame Relay technology places data in a frame for transmission, and provides a permanent virtual circuit (PVC) connection (i.e., a continuous, dedicated connection) between communicating end-points. ATM technology is a network connection switching technology based on transferring data in cells or packets having a fixed size. Individual cells are processed asynchronously relative to other related cells, and are queued before being multiplexed over a transmission path.

Referring to block 17 of FIG. 1, the Internet 17 will now be described. As used herein, the term "Internet" refers to an infrastructure having protocols and operating rules which effectively permit the creation of a world-wide "network of networks" By connecting a communication device, such as the communication terminal 1 or 22, to the Internet 17, information may be exchanged between that device and any other source/destination device which also is connected to the Internet 17. Thus, a matrix of interconnected communication devices is provided for enabling information to be exchanged between those devices. In general, devices connected to the Internet adhere to TCP/IP protocols.

Traditionally, various types of interconnecting equipment may form the interface 20, for connecting the network 13 to the Internet 17, such as, for example, optical fibers, wires, cables, switches, routers, and other types of communication equipment, although, for convenience, only the links 14 and 16 and the node 15 coupled to the test node 22 are shown in FIG. 1. Preferably, the node 15 (to which test node 22 is coupled) is a router located at a Point of Presence (POP) 15', and no other routers are coupled in the interface 20 between the router 15 and the network 13. A POP generally is provided and maintained by an enterprise, such as an Internet Service Provider (ISP), and is a location at which a network (e.g., network 13) can be connected to (interfaced with) another network entity, such as Internet 17.

Having described the various components of the communication system 10 in detail, an aspect of this invention will now be described. In accordance with this aspect of the invention, the inventor has invented a novel method, apparatus, and program for determining an amount of bandwidth that is available in at least one communication path which couples together nodes in a communication system. The method is preferably performed by exercising the communication path (formed by the communication system components coupling together the nodes 22 and 1) using information signals, to determine a minimum amount of time it takes for the information signals to traverse the path, in each direction, and by performing a predetermined algorithm employing the determined amount of time to calculate the bandwidth (in one of those directions). Preferably, the exercising operation includes a step of using first information signals to exercise a first portion of the communication path, formed by the links **24*a*, 24*b* and the router 15, to determine an amount of queuing delay (QD) in the router 15, based on a first predetermined algorithm. The exercising operation preferably also includes another step of using second information signals to exercise a second, larger portion of the communication path, coupling the test node 22 to the user communication terminal 1, to determine the minimum amount of time (also referred to as a "round trip time $RTT_{T\text{-}CPE}$") it takes for the information signals to be transferred bidirectionally between the test node 22 and user communication terminal 1 by way of that path. The bandwidth in question (e.g., the downlink bandwidth available in the portion of the communication path formed by the components coupling the user communication terminal 1 to the router 15), is then estimated based a second predetermined algorithm defining the bandwidth in terms of the queuing delay of the router 15** and the determined round trip time $RTT_{T\text{-}CPE}$.

Before describing the method of the invention in detail, the derivation of the first and second predetermined algorithms will first be described. As was described above, the first predetermined algorithm is employed for calculating the approximate amount of queuing delay (QD) of the router 15. The algorithm has a preliminary form defined in terms of the following basic formula (F1):

$$RTT_{IF1\text{-}IF2}=QD+PTT \tag{F1}$$

wherein $RTT_{IF1\text{-}IF2}$ represents the amount of time it takes for a hypothetical information packet originally transmitted by the test node controller **21*a* (through interface (IF1)) to the router 15, to be returned to that controller 21*a* by the router 15 (through test node interface (IF2**)). The term PTT of formula (F1) represents a packet travel time, and is defined by the following relationship (F2):

$$PTT=T_{IF1\text{-}POP}+T_{POP\text{-}IF2} \tag{F2}$$

In formula (F2), $T_{IF1\text{-}POP}$ represents the amount of time it takes for a packet to travel from the test node controller **21*a* to the router 15 by way of the interface (IF1) and link 24*a*, and $T_{POP\text{-}IF2}$ represents the amount of time it takes for a packet to travel from the router 15 to the test node controller 21*a* by way of the link 24*b* and interface (IF2**). Terms $T_{IF1\text{-}POP}$ and $T_{POP\text{-}IF2}$ of formula (F2) may also be expressed in terms of a relationship defined by the following formulas (F3) and (F4), respectively:

$$T_{IF1\text{-}POP}=\text{Bits}_{IF1\text{-}POP}/BW_{T\text{-}POP} \tag{F3}$$

$$T_{POP\text{-}IF2}=\text{Bits}_{POP\text{-}IF2}/BW_{T\text{-}POP} \tag{F4}$$

wherein $\text{Bits}_{IF1\text{-}POP}$ represents the number of bits of a hypothetical information packet transmitted from the test node 22 to the router 15 by way of interface (IF1) and link **24*a*, $\text{Bits}_{POP\text{-}IF2}$ represents the number of bits of a hypothetical packet returned by router 15 to the test node 22 by way of link 24*b* and interface (IF2), and $BW_{T\text{-}POP}$ represents the amount of bandwidth capacity provided by each link 24*a*, 24*b* coupled between the test node 22 and router 15. Assuming that the number of bits included in the hypothetical information packet transmitted from the test node 22 to the router 15** is the same as the number of bits included in the hypothetical returned packet, then, by substituting the right side of each formula (F3) and (F4) for the terms $T_{IF1\text{-}POP}$ and $T_{POP\text{-}IF2}$/respectively, in the above formula (F2), and then simplifying the formula (F2), the following simplified formula (F5) can be obtained:

$$PTT=2^*(PS)/BW_{T\text{-}POP} \quad \text{(F5)}$$

wherein (PS) represents the size (in bits) of each hypothetical information packet, and, as was previously described, $BW_{T\text{-}POP}$ represents the amount of bandwidth capacity provided in each link 24*a*, 24*b* coupled between the test node 22 and router 15. Now, by substituting the right side of the formula (F5) for the term PTT appearing in formula (F1) above, and then solving the resulting formula (F1) for the term (QD) (defining the theoretical queuing delay of router 15), the following formula (F6) can be obtained, which represents the first predetermined algorithm referred to above:

$$QD=RTT_{IF1\text{-}IF2}-(2^*(PS)/BW_{T\text{-}POP}) \quad \text{(F6)}$$

In formula (F6), and as was previously described, $RTT_{IF1\text{-}IF2}$ represents an approximation of the amount of time it takes for a hypothetical information packet originally transmitted from test node controller 21*a* (through interface (IF1)) to the router 15, to be returned to that controller 21*a* by router 15 (through test node interface (IF2)), and $BW_{T\text{-}POP}$ and (PS) represent the same information as described above.

Having described the manner in which the first predetermined algorithm (F6) is derived, the manner in which the second predetermined algorithm is derived will now be described. As was previously described, the second predetermined algorithm is employed for calculating the amount of downlink bandwidth available in a communication path formed by the portion of the communication system 10 coupled between the user communication terminal 1 and router 15. That algorithm may be derived based on the following preliminary relationship (F7):

$$RTT_{T\text{-}CPE}=T_{IF1\text{-}POP}+MQD+T_{POP\text{-}CPE}+TR_{CPE\text{-}POP}+MQD+TR_{POP\text{-}IF2} \quad \text{(F7)}$$

wherein $RTT_{T\text{-}CPE}$ represents the amount of time it takes for a second, return hypothetical information packet to be received by the test node controller 21*a* from user communication terminal 1, relative to a time when a first hypothetical information packet is transmitted from the test node controller 21*a* to that terminal 1. As was previously described, the term $T_{IF1\text{-}POP}$ in formula (F7) represents the amount of time it takes for the first hypothetical information packet to travel from the test node controller 21*a* (through interface (IF1)) to the router 15, the term MQD represents an estimated minimum queuing delay of the router 15 (which is determined as described below), and the term $T_{POP\text{-}CPE}$ represents the amount of time it takes for the first hypothetical information packet to travel from the router 15 to the controller 21*a* of user communication terminal 1. Moreover, the term $TR_{CPE\text{-}POP}$ represents a theoretical amount of time it takes for the second, return hypothetical information packet to be received by the router 15, after the first hypothetical information packet is received by the controller 21*a* of terminal 1 (although the signal delay within the user communication terminal 1 is typically negligible), and the term $T_{POP\text{-}IF2}$ represents the amount of time it takes for the second, return hypothetical information packet to travel from the router 15 to the controller 21*a* of test node 22.

Based on a known relationship between an information packet size and the bandwidth of a communication path transmitting the packet, the terms $T_{IF1\text{-}POP}$ and $T_{POP\text{-}CPE}$ in formula (F7) can be substituted for, and the two terms MQD in that formula (F7) can be combined to provide following formula (F8):

$$RTT_{T\text{-}CPE}=((PS)/BW_{T\text{-}POP})+2^*MQD+((PS)/BW_{POP\text{-}CPE})+TR_{CPE\text{-}POP}+TR_{POP\text{-}IF2} \quad \text{(F8)}$$

wherein (PS) represents the size of the first hypothetical information packet, $BW_{T\text{-}POP}$ represents an amount of bandwidth available in each individual link 24*a* and 24*b* coupled between the test node 22 and router 15, $BW_{POP\text{-}CPE}$ represents an amount of downlink bandwidth available in the communication path portion formed by the portion of the communication system 10 interposed between router 15 and user communication terminal 1, and the terms MQD, $TR_{CPE\text{-}POP}$, and $TR_{POP\text{-}IF2}$ represent the same information as was described above.

Assuming that the value of the term (PS) is substantially greater than the value of each term $TR_{CPE\text{-}POP}$ and $TR_{POPIF2}$ (i.e., the size of the first hypothetical information packet is substantially greater than that of the second, return hypothetical information packet), then the effect of the values represented by terms $TR_{CPE\text{-}POP}$ and $TR_{POP\text{-}IF2}$ in the overall formula (F8) is negligible, and can be ignored. As a result, the formula (F8) can be simplified to provide the following formula (F9):

$$RTT_{T\text{-}CPE}=((PS)/BW_{T\text{-}POP})+2^*MQD+((PS)/BW_{POP\text{-}CPE}) \quad \text{(F9)}$$

By rearranging the terms of that formula (F9) and solving for $BW_{POP\text{-}CPE}$ (representing the available bandwidth in the communication path portion coupling the user communication terminal 1 to router 15), the following formula (F10) can be obtained, which represents the second predetermined algorithm (F10) referred to above:

$$BW_{POP\text{-}CPE}=(PS)/(RTT_{T\text{-}CPE}-((PS)/BW_{T\text{-}POP})-2^*MQD) \quad \text{(F10).}$$

In the second predetermined algorithm (F10), predetermined values representing an information packet size and a bandwidth (available in each individual link 24*a*, 24*b*), respectively, may be substituted for the terms (PS) and $BW_{T\text{-}POP}$ (i.e., the values of those terms are known, as will be described below), leaving $RTT_{T\text{-}CPE}$ and MQD as the only unknown variables included in the algorithm (F10). In accordance with this invention, values for those unknown variables are determined using a novel method of this invention, and the second predetermined algorithm is solved to determine the amount of downlink bandwidth ($BW_{POP\text{-}CPE}$) available in the communication path portion coupled between the user communication terminal 1 and the router 15. The manner in which the method of the invention is performed, and the manner in which the first and second predetermined algorithms are employed in the invention, will now be described in detail, with reference being made to the flow diagram depicted in FIGS. 3*a*–3*c*.

In accordance with a preferred embodiment of the invention, the method is performed in two stages. A first stage includes the steps depicted in FIG. 3*a*, and is performed to approximate a minimum amount of queuing delay (MQD) of the router 15. A second stage of the method includes the steps shown in FIGS. 3*b* and 3*c*, and is performed to determine a value for the term $RTT_{T\text{-}CPE}$ described above, and also to determine the amount of downlink bandwidth ($BW_{POP-CPE}$) available between the router 15 and user communication terminal 1.

Figure 3A:
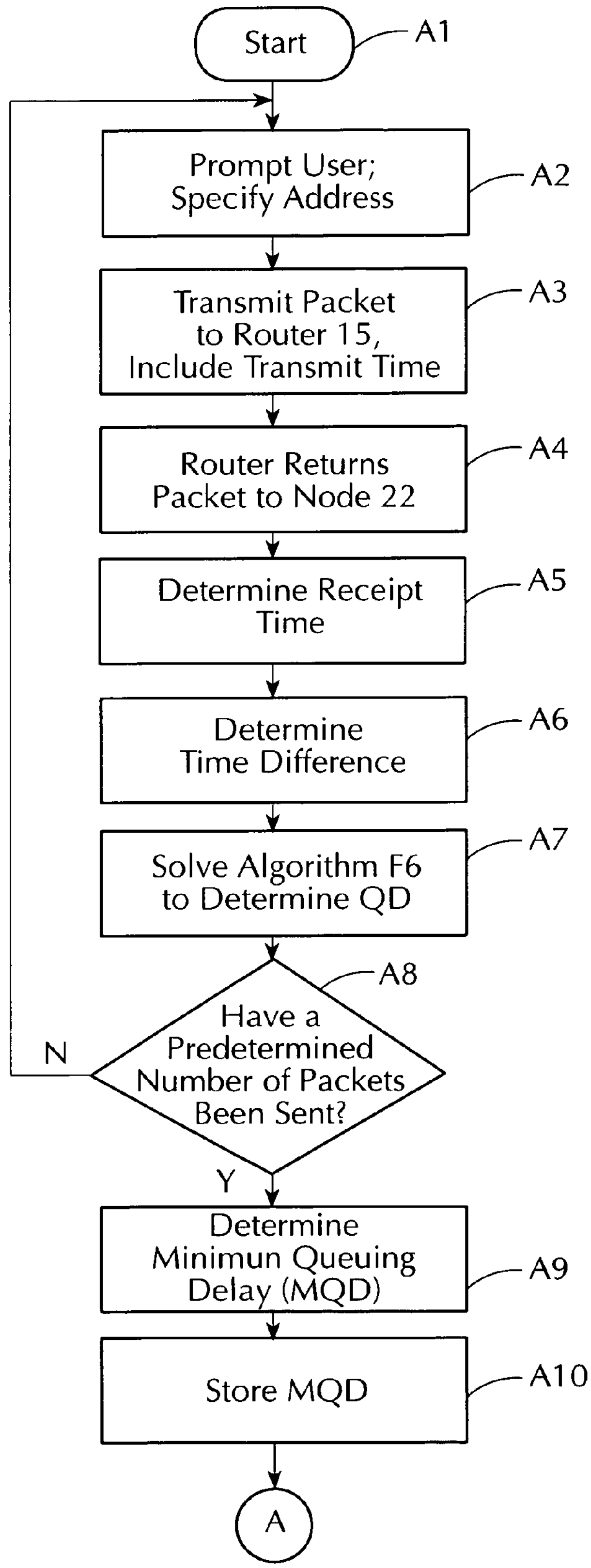
FIGS. 3*a*–3*b* show a logical flow diagram of a method for determining an amount of bandwidth available in a communication path coupling multiple points in a communication system, in accordance with one embodiment of this invention.

In step A1 of FIG. 3*a*, the first stage of the method is started, and it is assumed that the user communication terminal 1 is "connected" to the Internet 17 through the intermediate components 5, 3, 6, 7, 10-1, 9, 12, 13, and 20 of the communication system 10, and that the test node 22 also is "connected" to the Internet 17 through components (IF1), (IF2), 24*a*, 24*b*, 15, and 16 of the system 10. For example, each terminal 1 and 22 may be connected to the Internet 17 in response to a user of the terminal causing a predetermined icon presented on the display 21*e* of the terminal to be selected, in which case one of the programs stored in the memory 21*c* of the terminal responds by communicating through the corresponding intermediate components to connect the terminal to the Internet 17, in accordance with known TCP/IP protocols.

Figure 4:
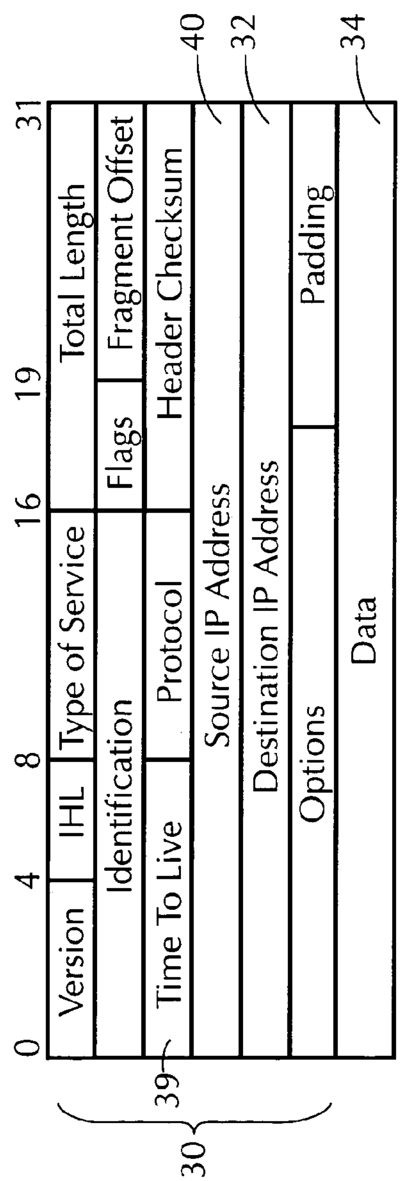
FIG. 4 shows an example of a message format employed for communicating messages during the performance of the method of FIGS. 3*a*–3*b*, according to one embodiment of the invention.

In step A2, it is assumed that the user of test node 22 operates the user interface 21*d* of that test node 22 to cause a predetermined view (not shown) to be presented on the display 21*e*. Preferably, the predetermined view prompts the user to specify an address (e.g., an IP address) of one of the interfaces (IF1) and (IF2) to which the user desires information to be sent. Assuming that the user then operates the user interface 21*d* to enter into the controller 21*a* information specifying the address of the interface (IF2) (i.e., NIC2) of test node 22, and then enters a command specifying that information packets be transmitted to that destination, then the controller 21*a* responds by transmitting an information packet to the router 15 by way of interface (IF1) and communication link 24*a* (step A3). Preferably, the transmitted information packet has a format in accordance with, for example, RFC 791 (or later revisions thereof), and has a size that is predetermined based on a value of a Packet Size Variable (PSV1) 36 stored in the memory 21*e* of the test node 22, although in other embodiments, that value may be specified in step A3 by the user through user interface 21*d* (in response to, for example, a prompt being presented on display 21*e* in step A2). The transmitted information packet preferably includes the user-specified address (i.e., the address of (IF2)), within, for example, a Destination IP Address field 32 in a header 30 of the packet (see, e.g., FIG. 4), and information identifying the time at which the packet was transmitted from the controller 21*a* in step A3. That packet transmission time information is preferably included in a data field 34 appended to the header field 30 (FIG. 4), and may be determined using any known technique. For example, the controller 21*a* may refer to an internal clock 21*f* within the controller 21*a*, immediately prior to transmitting the packet, to determine the packet transmission time.

At some time after receiving the information packet transmitted by test node 22 to the router 15 in step A3, the router 15 performs a known routing process to correlate the destination address from field 32 of the received packet to corresponding information stored in an internal routing table (not shown) of the router 15. Based on that corresponding information, the router 15 then forwards the packet through an output port specified by the corresponding information (which, in this case, specifies the output coupled to the link 24*b*) in the routing table. As a result, the packet is returned to the controller 21*a* of the test node 22, by way of the link 24*b* and the interface (IF2) (step A4).

In step A5, the controller 21*a* of test node 22 responds to receiving the information packet returned by the router 15 in step A4 by referring to the internal clock 21*f* to determine the receipt time of the packet (i.e., the time at which the packet is received). Then, in step A6 the controller 21*a* extracts the information specifying the packet's original transmission time from field 34 of the received packet, and employs that information and the packet receipt time determined in step A5 to determine a difference between the packet receipt time and the original packet transmission time. For example, the controller 21*a* may determine that difference by subtracting the original packet transmission time from the packet receipt time. The difference value determined in step A6 represents the amount of time taken for the packet transmitted by the test node controller 21*a* in earlier step A3, to be returned to that controller 21*a* by the router 15 in step A4.

After step A6 is performed, control passes to step A7 where the controller 21*a* of test node 22 substitutes the difference value determined in previous step A6, the value specified by the PSV1 variable 36 stored in memory 21*c*, and the value of a variable ($VBW_{T-POP}$) 37 (stored in memory 21*c* of test node 22) representing the amount of bandwidth available in the link 24*a*, into the first predetermined algorithm (F6) described above, in place of the terms $RTT_{IF1-IF2}$ (PS), and $BW_{t-POP}$, respectively, in that algorithm (F6). The controller 21*a* then solves the algorithm (F6), which is reproduced below for convenience, to determine a value of the term (QD).

$$QD=RTT_{IF1\text{-}IF2}-(2*(PS)/BW_{T\text{-}POP}) \qquad \text{(F6)}$$

The value of (QD) determined as a result of the performance of the algorithm (F6) represents an approximation of the amount of propogation delay experienced by the information packet while passing through the router 15, as a result of the queuing delay in the router 15, and is stored in the memory 21*c* of the test node 22 by the controller 21*a* of that test node 22 (step A7).

Thereafter, control passes to step A8 where the controller 21*a* of the test node 22 determines whether or not a predetermined number of information packets have been transmitted by the test node 22 to the router 15, since the method began in earlier step A1. For example, the controller 21*a* may perform step A8 by comparing a value of a counter variable (not shown) indicating the number of packets already transmitted by the test node 22, to a predetermined value (not shown), to determine whether or not the value of the counter variable equals the predetermined value. Preferably, the predetermined value is large enough for enabling a large number of router queuing delay samples to be obtained.

If the performance of step A8 results in a determination of 'No' ('N' at step A8), then control passes back to step A2 where the method then continues in the above-described manner. If, on the other hand, the performance of step A8 results in a determination of 'Yes' ('Y' at step A8), then control passes to step A9, where a further step is performed.

According to a preferred embodiment of the invention, in step A9 the controller 21*a* examines all of the queuing delay (QD) values stored previously in the memory 21*c* during previous performances of step A7, to determine which one of those values is smallest, and then stores the determined smallest value in the memory 21*c* of the test node 22 (step A10). That value represents the minimum queuing delay of the router 15 determined during the performance of the first stage of the method of the invention.

It should be noted that any suitable, known technique may be employed by the controller 21*a* to determine the smallest queuing delay value in step A9 (such as, e.g., a technique comparing pairs of the values to determine a smallest value), and thus that step will not be described in further detail herein. In other embodiments of the invention, step A9 may be performed using known techniques to determine a median value, average value, or other desired value among the (QD) values stored in the memory 21*c* during previous performances of step A7, depending on applicable operating criteria.

Figure 3B:
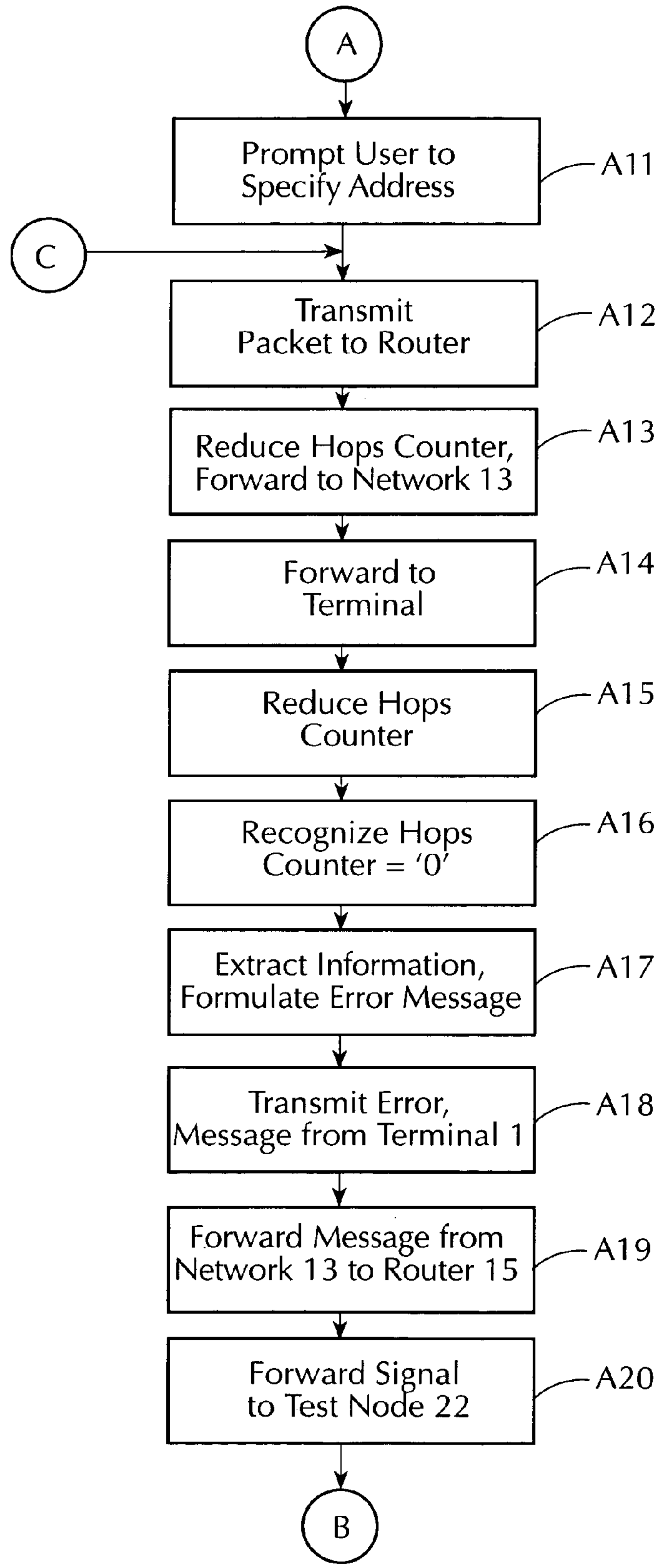

After step A10 is performed, control passes through connector (A) to FIG. 3*b*, where the second stage of the method is started. In step A11 of FIG. 3*b*, the controller 21*a* of test node 22 presents a view (not shown) on the test node display 21*e* prompting the user to specify an address (e.g., an IP address) of a destination for which he desires to conduct an Internet connection bandwidth test. Assuming that the user desires to conduct such a test for the user communication terminal 1, and thus enters information specifying an address of that terminal 1 into controller 21*a* in the above-described manner, then the controller 21*a* responds in step A12 by transmitting an information packet to the router 15 by way of test A12). The information packet transmitted in step A12 preferably has a message format in accordance with, for example, RFC 791 (or later revisions thereof), and includes various data fields, such as, for example, those depicted in FIG. 4. Preferably, data field 34 (FIG. 4) of the transmitted information packet includes information specifying the time at which the packet was transmitted from the controller 21*a* in step A12 (as determined by internal clock 21*f*), a source address field 40 of the packet includes information identifying a source address of the interface (IF2) (i.e., NIC2), a Destination IP Address field 32 of the packet includes information identifying the destination address specified by the user in previous step A11, and a Time-To-Live field 39 in a header 30 of the packet includes information specifying a maximum number of hop counts through which the information packet is permitted to travel. That number of hop counts preferably equals the number of hops existing in the portion of the communication system 10 provided from the test node 22 to the user communication terminal 1, and, in this example, is '2' (e.g., the router 15 represents one hop, and the user communication terminal 1 represents another hop).

At some time after receiving the information packet transmitted by the test node 22 in step A12, the router 15 extracts the hop counts value (e.g., '2') from the Time-To-Live field 39 in the received packet, reduces that value by '1', and then reinserts the resulting reduced value (e.g. '1') back into the field 39 of the received packet (step A13). Also in step A13, the router 15 then operates in the above-described manner to correlate the destination address from field 32 of the received packet to corresponding information stored in the internal routing table (not shown) of the router 15. Then, based on that corresponding information, the router 15 forwards the packet, including the reduced hop counts value, through the output specified by the corresponding information (which, in this case, specifies the output coupled to communication link 14) in the routing table. As a result, the information packet is forwarded through the link 14 to the network 13, which, in turn, responds in step A14 by operating in the above-described manner to forward the packet to the user communication terminal 1 (by way of system components 12, 8, 6, 3, and 5), based on the destination address included in field 32 of the packet (step A14).

Figure 5:
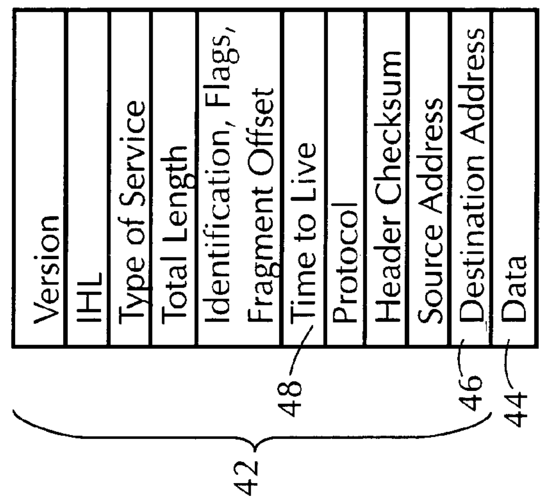
FIG. 5 shows an example of another message format employed for communicating error messages during the performance of the method of FIGS. 3*a*–3*b*, according to an embodiment of the invention.

In step A15 of FIG. 3*b*, the controller 21*a* of user communication terminal 1 responds to receiving the information packet in previous step A14 by extracting the hop counts value (e.g., '1') from the Time-To-Live field 39 of the received packet, and by then reducing the extracted value by '1' to obtain a resulting value of '0'. The controller 21*a* of user communication terminal 1 then recognizes that the obtained value is '0' in step A16, and then responds by extracting (i) the information specifying the packet transmission time from data field 34 of the received information packet, and (ii) the source address information from source address field 40 of the received packet, and by forming an error message that includes the extracted information (i) and (ii) (step A17). Preferably, the message formed in step A17 is an Internet Control Message Protocol (ICMP) message having a message format in accordance with, for example, RFC 792 (or later revisions thereof), includes data fields as shown in, for example, FIG. 5, and has a size (e.g., 36 bytes) that is substantially less than that of the information packet previously transmitted by the test node 22 in step A12 (to render the terms $TR_{CPE\text{-}POP}$ and $TR_{POP\text{-}IF2}$ in formula (F8) negligible). In the preferred embodiment, the information (i) extracted in step A17 is included in a beginning portion (e.g., the first eight bytes) of a data field 44 of the error message, and the information (ii) extracted in step A17 is included in a Destination Address field 46 of a header 42 in the message.

After forming the error message in the above-described manner, the controller 21*a* of user communication terminal 1 transmits the message as an information packet, to the network 13, via system components 5, 3, 6, 8, and 12 (step A18). The network 13 then responds in step A19 in the above-described manner by forwarding the message through link 14 to the router 15, based on the information included in the Destination Address field 46 of the message. Thereafter, the router 15 responds to receiving the message by operating in the above-described manner to cause the received message to be forwarded to the test node controller 21*a*, by way of components 24*b* and (IF2), based on the information included in the Destination Address field 46 of the message and corresponding information stored in the internal routing table of router 15 (step A20). Control then passes through connector (B) to step A21 of FIG. 3*c*.

Figure 3C:
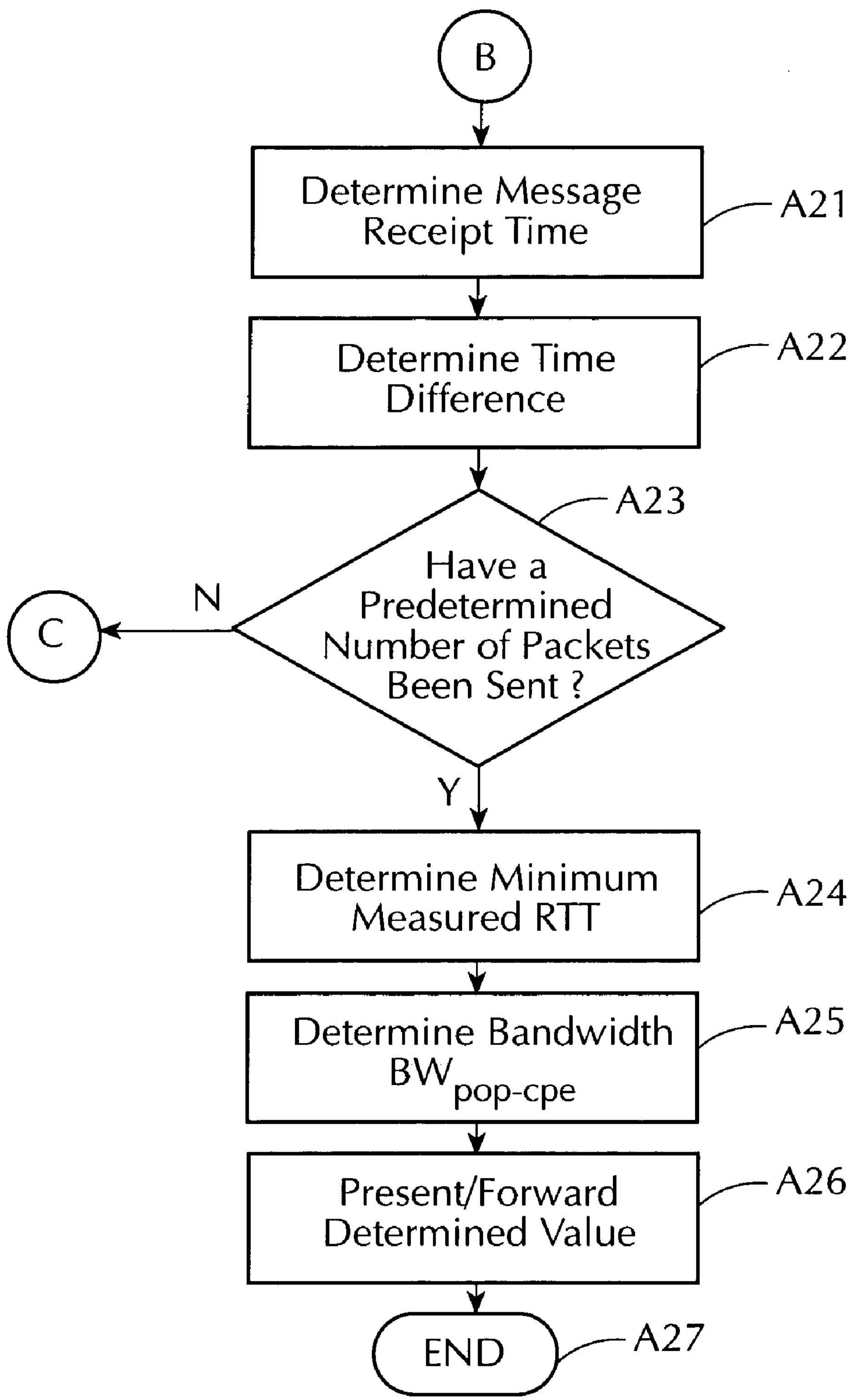

In step A21 of FIG. 3*c*, the controller 21*a* of test node 22 responds to receiving the message routed thereto in previous step A20 by referring to the internal clock 21*f* to determine the receipt time of the message in the controller 21*a*. Then, in step A22, the controller 21*a* extracts the information specifying the original packet transmission time from field 44 of the received message, and employs that information and the message receipt time determined in step A21, to determine a difference between the message receipt time and the original packet transmission time (step A22), in a similar manner as was described above. The value of the difference determined in step A22 also is referred to in this description as a "round-trip time ($RTT_{T\text{-}CPE}$) value", and represents an approximation of the amount of time taken for the test node controller 21*a* to receive the return error message (from user communication terminal 1), after originally transmitting the information packet in earlier step A12 (FIG. 3*b*). That determined value is then stored by the controller 21*a* of the test node 22 in the test node memory 21*c*.

After step A22 is performed, control passes to step A23 where the test node controller 21*a* determines in the above-described manner whether or not a predetermined number of information packets has been transmitted by the test node 22 to the user communication terminal 1, since the second stage of the method began in earlier step A11. Like step A8 of the first method stage described above, step A23 is preferably performed so that a large number of round-trip time samples are obtained.

If the performance of step A23 results in a determination of 'No' ('N' at step A23), then control passes through connector (C), back to step A12 of FIG. 3*b*, where the method then continues in the above-described manner. If, on the other hand, the performance of step A23 results in a determination of 'Yes' ('Y' at step A23), then control passes to step A24 where the test node controller 21*a* examines the $RTT_{T\text{-}CPE}$ values stored previously in the test node memory 21*c* during the previous performances of step A22, to determine which one of those values is smallest, and then stores the determined smallest value in the memory 21*c* of the test node 22 (step A24). That smallest value represents the minimum determined amount of time taken (i.e., the minimum round-trip time) for the test node controller 21*a* to receive an error message from the user communication terminal 1, after transmitting a corresponding, error-provoking information packet in step A12 during the performance of the second stage of the method.

It should be noted that, as for the minimum queuing delay determination described above with respect to the first method stage (FIG. 3*a*), any suitable technique may be employed by the test node controller 21*a* to determine the smallest round-trip time ($RTT_{T\text{-}CPE}$) value in step A24, and one skilled in the art would readily appreciate in view of this description how to formulate an algorithm for use by the controller 21*a* in making such a determination. In other embodiments of this invention, step A24 may be performed to determine a median value, average value, or other desired value among the determined round-trip time ($RTT_{T\text{-}CPE}$) values stored in memory 21*c*, depending on applicable performance criteria.

After the minimum round-trip time value is determined in step A24, the controller 21*a* retrieves the values of the variables PSV2 and $VBW_{T\text{-}POP}$ and the minimum queuing delay (MQD) value (stored in earlier step A10) from the test node memory 21*c*, and substitutes the retrieved values into the second predetermined algorithm (F10) in place of the terms (PS), $BW_{T\text{-}POP}$, and MQD, respectively, in that algorithm. The controller 21*a* also substitutes the minimum round-trip time value determined in previous step A24 into the second predetermined algorithm (F10), in place of the term $RTT_{T\text{-}CPE}$ in that algorithm. Thereafter, the test node controller 21*a* performs the second predetermined algorithm (F10), which is reproduced below for convenience, to solve for the term $BW_{POP\text{-}CPE}$ in that algorithm (step A25).

$$BW_{POP\text{-}CPE}=(PS)/(RTT_{T\text{-}CPE}-((PS)/BW_{T\text{-}POP})-2*MQD) \quad \text{(F10)}$$

The value obtained as a result of the performance of the algorithm (F10) in step A25 represents an approximation of the maximum amount of downlink bandwidth available in the communication path portion formed by the intermediate system components 5, 3, 6, 7, 10-1, 9, 12, 13, and 14, coupled between the user communication terminal 1 and router 15.

After the downlink bandwidth value is determined in step A25, control passes to step A26, where the controller 21*a* of test node 22 causes that value to be displayed on the display 21*e* of the node 22. In other embodiments of the invention, the controller 21*a* may also cause the value to be stored in the test node memory 21*c*, and/or forwarded in a message to the user communication terminal 1 or some other predetermined destination (not shown) (step A26), where, the value may be presented to another user or stored for later retrieval thereof. Thereafter, control passes to step A27 where the method terminates.

Figure 6:
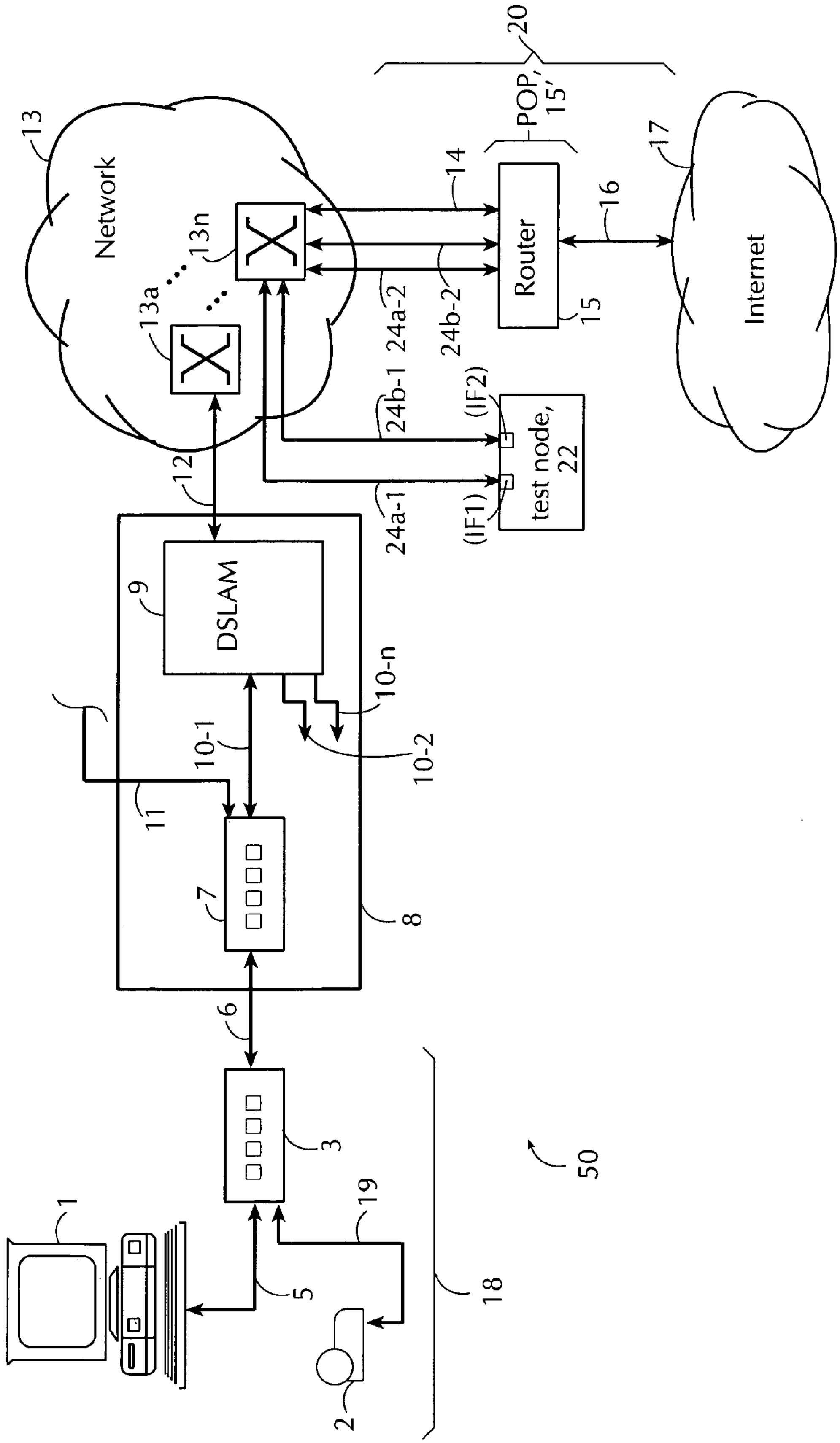
FIG. 6 is a block diagram of another communication system 50 that is suitable for practicing this invention, wherein the communication system 50 includes a test node 22 constructed and operated according to this invention.

Another embodiment of this invention will now be described, with reference being made to FIG. 6. In FIG. 6, a communication system 50 constructed in accordance with this embodiment is shown. The system 50 comprises the same components 1 to 22 as the system 10 of FIG. 1 described above. However, in this embodiment, the test node 22 is coupled to the router 15 through the network 13 and a plurality of bidirectional communication links 24*a*-1, 24*a*-2, 24*b*-1, and 24*b*-2. Preferably, the links 24*a*-1 and 24*b*-1 bidirectionally couple the respective test node interfaces (IF1) and (IF2) to a switch 13*n* of the network 13, and the links 24*a*-2 and 24*b*-2 each bidirectionally couple the switch 13*n* to the router 15, although in other embodiments, the links 24*a*-1, 24*b*-1 and 24*a*-2, 24*b*-2 may be coupled to one or more different ones of the switches 13*a*–13*n* in the network 13 and the test node 22 may be coupled to the router 15 through more than one of those switches 13*a*–13*n*. Preferably, the links 24*a*-1, 24*a*-2, 24*b*-1, and 24*b*-2 are high speed T1 or T3 links. The links 24*a*-1, 24*a*-2, 24*b*-1, and 24*b*-2 provide permanent virtual circuits (PVCs) between the test node 22 and router 15, in a case where network 13 is a Frame Relay network, and provide virtual circuits (VCs) between the test node 22 and router 15, in a case where the network 13 is an ATM network.

In accordance with this embodiment of the invention, the above-described method of FIGS. 3*a*–3*c* is performed in a similar manner as was described above, except that information packets exchanged between the test node 22 and router 15 are transferred through the network 13 (by way of links 24*a*-1, 24*a*-1 or 24*b*-1, 24*b*-2), and information packets that are forwarded from the test node 22 to the user communication terminal 1 pass through the components 24*a*-1, 24*a*-2 (or 24*b*-1, 24*b*-2) 15, 14, 13, 12, 8, 6, 3, and 5, in that order. Conversely, information packets that are forwarded from the terminal 1 to the test node 22 pass through the same components, but in a reversed order.

A method for determining the amount of bandwidth available in a communication path in accordance with a further embodiment of this invention will now be described. The method according to this embodiment of the invention is performed by transferring a file between nodes that are coupled together through the path, and by determining the rate at which the file is received at the receiving node, to obtain the communication path bandwidth. The method of this embodiment of the invention may be employed in conjunction with either of the system configurations depicted in FIGS. 1 and 6, or in any other suitable type of communication system/network, although for convenience, the following description is described only in the context of the method being employed in the system 10 of FIG. 1.

Figure 7:
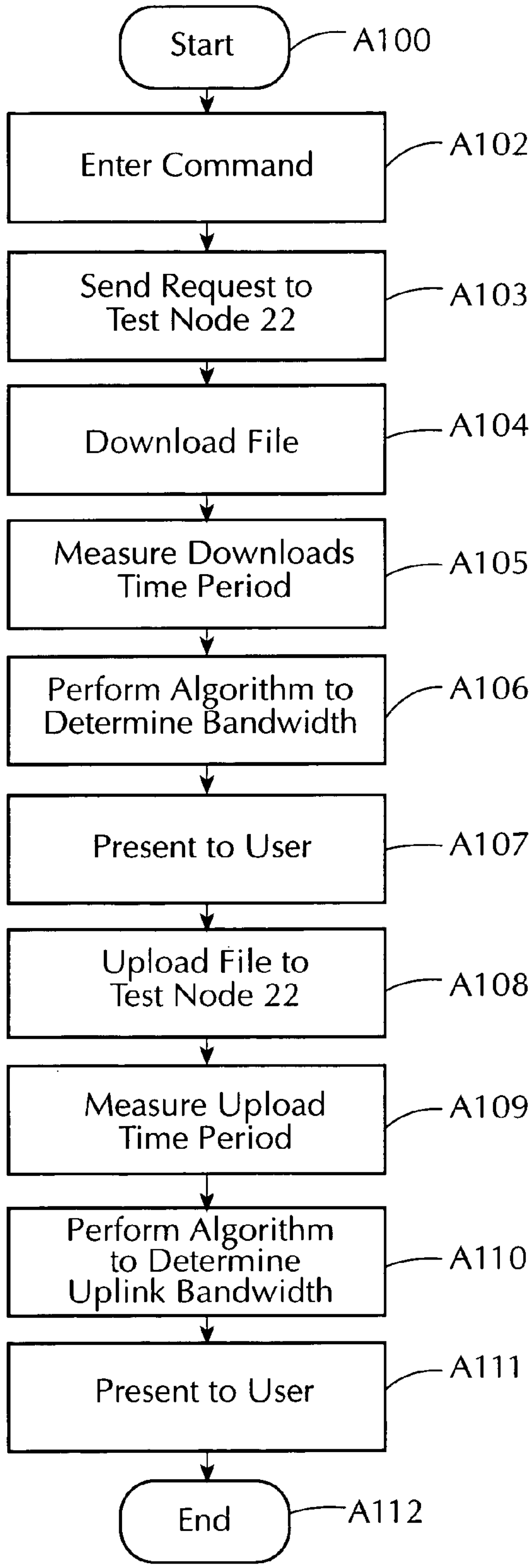
FIG. 7 shows a logical flow diagram of a method for determining an amount of bandwidth available in a communication path coupled between multiple points in a communication system, according to another embodiment of this invention.

Referring now to FIG. 7, a flow diagram of the method according to this embodiment of the invention is shown. In step A100 of FIG. 7 the method is started, and it is assumed that both the user terminal 1 and the test node 22 are connected to the Internet 17 in the above-described manner. It also is assumed that the user of user communication terminal 1 desires to determine the uplink and downlink connection bandwidths provided by the communication system 10 for the terminal 1, and thus operates the user interface 21*d* of that the terminal 1 to cause a command to be entered into the controller 21*a* requesting that the user be notified of those bandwidths (step A102).

Thereafter, in step A103 the controller 21*a* of user communication terminal 1 responds to receiving the command by forming a message that includes information specifying the user request, the address of user communication terminal 1 (representing a source address), and the destination address of a predetermined one of the interfaces (IF1), (IF2) of test node 22, such as, e.g., the interface (IF1). The controller 21*a* of terminal 1 then communicates the formed message to the test node 22, by way of intermediate system components 5, 3, 6, 8, 12, 13, 14, and 15, and 24*a*, in the above-described manner (step A103). In response to eventually receiving that message, the controller 21*a* of test node 22 responds by extracting the source and destination address information from the message and by retrieving a predetermined file from the memory 21*c* of the test node 22. Preferably, the predetermined file has a size that is substantially larger than the amount of the downlink bandwidth (e.g., on the order of about 100 times the amount of the downlink bandwidth) expected to be available in the communication path formed by the system components coupled between the node 22 and the terminal 1. That file also preferably includes a first predetermined code (e.g., a Start-of-File code) at a beginning portion of the file, and a second predetermined code (e.g., an End-of-File code) at an end portion of the file (see, e.g., RFC 959).

Thereafter, the test node controller 21*a* downloads the retrieved file, along with the extracted source and destination address information, to the user communication terminal 1 by way of system components 24*a*, 15, 14, 13, 12, 8, 6, 3, and 5 (step A104). Preferably, the downloading step A104 is performed in accordance with, for example, RFC 959 (File Transfer Protocol) (or later revisions thereof), and the downloaded information has a format in accordance with that protocol, although in other embodiments, any other suitable types file transfer protocols/message formats may also be employed.

In step A105, the controller 21*a* of the user communication terminal 1 measures the period of time taken for the file to be downloaded into that controller 21*a*, based on the first and second predetermined codes included in the file and time kept by the internal clock 21*f* of the terminal 1, and also determines the size of the file. For example, the controller 21*a* may measure the file download time by detecting the receipt of the first predetermined code included in the received file, and by then referring to the internal clock 21*f* of that controller 21*a* to determine the receipt time of that first predetermined code. Also, as the end portion of the file is received, the controller 21*a* detects the second predetermined code (e.g., End Of File code) included in that end portion of the received file, and again refers to the internal clock 21*f* to determine the receipt time of the second predetermined code. Thereafter, the controller 21*a* determines the period of time taken for the file to be downloaded thereto by subtracting the determined receipt time of the first predetermined code from the determined receipt time of the second predetermined code. Also by example, the controller 21*a* may determine the size of the downloaded file by setting a predetermined counter variable (initially '0') equal to value '1', in response to detecting a first byte (e.g., Start-of-File) of the file, and by then increasing the value of that variable by '1' each time a next byte of the downloaded file is received, to determine the total number of bytes included in the downloaded file. The value of that counter variable remaining after a last, predetermined byte (e.g., End-Of-File) of the file has been received indicates the size (in bytes) of the downloaded file. Preferably, the controller 21*a* then multiplies that counter variable value by '8' to determine the total number of bits included in the file (representing the file size in bits), although in other embodiments that step need not be performed.

After determining both the period of time taken for the file to be downloaded into the controller 21*a* of the user communication terminal 1, and the size of the downloaded file (in step A105), the controller 21*a* of that terminal 1 then performs a predefined algorithm that employs the determined file size and the time period measured in step A105 to determine a value representing an approximation of the rate at which the file was downloaded through the communication system 10 (step A106). For example, that algorithm may be performed by dividing the determined size of the downloaded file by the measured download time period. As can be appreciated by one skilled in the art, the value determined in step A106 also represents the amount of downlink bandwidth available in the communication path formed by the intermediate system components 24*a*, 15, 14, 13, 12, 9, 10-1, 7, 6, 3, and 5, coupled between the node 22 and terminal 1.

After step A106 is performed, control passes to step A107 where the controller 21*a* of user communication terminal 1 presents the determined downlink bandwidth value to the user of terminal 1 through the output user-interface 21*e* (step A107). The controller 21*a* also uploads the received file, along with information identifying the addresses of the respective terminals 1 and 22, back to the test node 22, by way of the intermediate system components 5, 3, 6, 8, 12, 13, 14, 15, 24*a*, and (IF1), in the above-described manner (step A108). Preferably, that uploading step A108 is performed in accordance with, for example, RFC 959 (File Transfer Protocol) (or later revisions thereof), and the uploaded information has a format in accordance with that protocol, although in other embodiments, any other suitable types file transfer protocols/message formats may also be employed.

In step A109, the controller 21*a* of the test node 22 measures both the period of time taken for the file to be uploaded into that controller 21*a*, and the size of the uploaded file, in a similar manner as was described above. For example, the controller 21*a* preferably measures the file upload time period by detecting the first and second predetermined codes included in the respective beginning and ending portions of the file, referring to the time kept by the internal clock 21*f* (within test node 22), upon detecting each code, to determine the receipt time of each respective code, and by subtracting the determined receipt time of the first predetermined code from that of the second predetermined code, to determine the file upload time period. Also by example, the controller 21*a* preferably measures the size of the uploaded file by detecting each byte of the uploaded file, as it is being received, and by increasing the value of a predetermined counter variable (initially '0') by '1' in response to detecting each individual byte of the file, to determine (count) the total number of bytes included in the uploaded file. The value of that counter variable remaining after a last, predetermined byte (e.g., End-of-File) of the file has been received indicates the size (in bytes) of the uploaded file. Preferably, the controller 21*a* then multiplies that remaining counter variable value by '8' to determine the total number of bits included in the file, although in other embodiments that step need not be performed.

After determining the file size and upload time period in step A109, the controller 21*a* of test node 22 then performs a predefined algorithm that employs the determined file size and upload time period to determine a value representing the rate at which the file was uploaded through the communication system 10 (step A110). That determined value also represents the amount of uplink bandwidth available in the communication path formed by the system components 5, 3, 6, 7, 10-1, 9, 12, 13, 14, 15, 5, and 24*a* coupled between the terminal 1 and the node 22. As for the predefined algorithm performed within the terminal 1 in earlier step A106, the predefined algorithm performed by the test node controller 21*a* in step A110 may be performed by, for example, dividing the determined size of the uploaded file by the determined file upload time period.

Thereafter, in step A111 the test node controller 21*a* forwards information representing the uplink bandwidth value determined in step A110 in a message to the user communication terminal 1, by way of the intermediate system components 15, 14, 13, 12, 8, 6, 3, and 5 (step A111). In other embodiments, the test node controller 21*a* may also forward that message to another predetermined destination (not shown), store the value in the test node memory 21*c* for later retrieval, and/or present the value to a user of the test node 22 via the output user-interface 21*e*.

In step A112, the controller 21*a* of user communication terminal 1 responds to receiving the message transmitted by the test node 22 in previous step A111 by presenting the determined bandwidth value included in the received message to the user of the terminal 1, through the output user-interface 21*e* of the terminal 1. In other embodiments, the controller 21*a* may store that value in the memory 21*c* of the terminal 1 for later retrieval by the user of that terminal 1, depending on applicable performance criteria. Thereafter, the method terminates.

The foregoing embodiments of the invention enable the bandwidth available in a communication path coupled between nodes in a communication system to be determined, in a manner which overcomes the problems associated with the prior art methods described above. For example, the method of FIGS. 3*a*–3*c* can be initiated to determine the downlink bandwidth from a single location (i.e., test node 22), and does not require the use of any additional software in the user communication terminal 1. The methods of the invention may be employed regardless of the type of backbone employed in the communication system (e.g., the methods may be used in FR networks, ATM networks, etc.), and may be employed both in systems in which IP address are statically allocated and systems in which IP addresses are DHCP based.

Also by example, because the test node 22 is coupled to the user communication terminal 1 through the router 15 located at the POP 15', it is not necessary to rebuild any virtual circuits before conducting the methods of the invention, since the router 15 automatically facilitates the transfer of information (e.g., a file or information packets) between those devices, by way of communication path existing between those devices. As a result, problems associated with the rebuilding of virtual circuits are avoided.

It should be noted that while this invention is described in the context of the user communication terminal 1 communicating with the Internet 17 through a communication system having the particular configurations shown in FIG. 1 and FIG. 6, the invention is not necessarily limited for use only in conjunction with those particular system configurations, but may also be employed in any other suitable types of communication systems/networks, depending on applicable system/network architecture. It also should be noted that although the invention is described in the context of the user communication terminal 1 communicating with the Internet 17 through the central office switching station 8, network 13, and communication interface 20, in other embodiments, no switching station 8, network 13, or interface 20 need be employed, and the user communication terminal 1 may communicate with the Internet 17 through other suitable types of interface components, depending on applicable system architecture. Moreover, although the invention is described in the context of the CPE 18 having the user communication terminal 1 for communicating with other components of the system 10 through the modem 3, in other embodiments, the user communication terminal 1 may be included within a WAN, LAN, or a wireless network, and may communicate with the other components of the system 10 through a network server or wireless transceiver (not shown). It should be further noted that while the method shown in FIGS. 3*a*–3*c* is described in the context of the terminal 22 prompting the user to enter destination address information separately in steps A2 and A11, and in the context of the user of terminal 22 initiating the performance of that method, it also is within the scope of this invention for the user of the terminal 22 to enter that information in a single step A2, and/or for the user of terminal 1 to initiate the performance of the method by causing a command to be transmitted to the terminal 22, and/or for the method to be initiated automatically, without any user intervention. Similarly, while the method of FIG. 7 is described in the context of the user of terminal 1 initiating the performance of the method, it also is within the context of this invention for that method to be initiated at the test node 22, either automatically or in response to a user-entered command.

Furthermore, it is within the scope of this invention for the user of either terminal 1, 22 to program the value of one or more of the above-described variables PSV1, PSV2, and $VBW_{T\text{-}POP}$ into the controller 21*a* of test node 22, and for the user of either terminal 1 or 22 to pre-specify the number of packets to be transmitted by the test node 22 during the first and second stages of the method of FIGS. 3*a*–3*c*. Furthermore, the sizes (defined by variables PSV1 and PSV2) of the information packets employed in those stages may either be the same or different, depending on applicable performance criteria, user preferences, and the like.

Also, although the method of FIGS. 3*a*–3*c* is described in the context of there being only the single router 15 coupled between the test node 22 and user communication terminal 1, the invention may also be employed in systems having more or less than that number of routers 15. For example, in cases in which more than a single router exists between the test node 22 and terminal 1, the value included in the TTL field 39 during the performance of the method of FIGS. 3*a*–3*c* is preferably set to account for that number of routers, and the above-described algorithms preferably are adapted to account for that number of routers (i.e., for enabling a minimum queuing delay (MQD) to be determined for each router, in the above-described manner), in a manner as would be readily appreciated by one skilled in the art in view of this description.

While the invention has been particularly shown and described with respect to preferred embodiments thereof, it will be understood by those skilled in the art that changes in form and details may be made therein without departing from the scope and spirit of the invention.

What is claimed:

1. A method for determining an amount of bandwidth available in at least one communication path coupling a plurality of nodes together, the method comprising the steps of:

exercising a first, smaller portion of the at least one communication path that includes a first one of the plurality of nodes, using first information signals, to determine an amount of signal propagation delay present in the first node;

exercising a second, larger portion of the at least one communication path that includes the first node and a second node of the plurality of nodes, using second information signals, to determine an amount of time it takes for at least one of the second information signals to traverse the second, larger portion of the at least one communication path in at least one direction; and determining an amount of bandwidth available in at least a portion of the at least one communication path, based on the determined amount of time and the determined amount of propagation delay.

2. A method as set forth in claim 1, wherein the first node is located at a Point of Presence, and wherein the bandwidth is in a downlink direction in the at least one communication path, extending from the first node to the second node.

3. A method as set forth in claim 1, wherein the step exercising the first, smaller portion of the at least one communication path includes steps of:

forwarding individual ones of the first information signals from a test node, through the first node, and then back again to the test node, by way of the first, smaller portion of the at least one communication path;

determining the amount of time taken for each individual first information signal to arrive back at the test node, after being forwarded from the test node; and determining a minimum amount of signal propagation delay experienced by the first information signals while passing through the first node, based on the determined amount of time taken for those first information signals to arrive back at the test node; and wherein the step of determining the amount of bandwidth available in the at least one communication path is performed based, at least in part, on the determined minimum amount of signal propagation delay.

4. A method as set forth in claim 3, wherein the first node includes a router, and the signal propagation delay is caused by a queuing delay in the router.

5. A method as set forth in claim 3, wherein the step of determining the minimum amount of signal propagation delay is also performed based on at least one of a size of an individual first information signal and a predetermined bandwidth provided between the test node and the first node.

6. A method as set forth in claim 1, wherein the step of exercising the second, larger portion of the at least one communication path using the second information signals includes the steps of:

forwarding at least one second information signal from a test node through the second, larger portion of the communication path to the second node, to cause that second node to transmit at least one third information signal back to the test node through the second, larger portion of the at least one communication path; and determining a minimum amount of time taken for the at least one third information signal to arrive at the test node, relative to a time when the at least one second information signal was forwarded from the test node; and wherein the step of determining the amount of bandwidth available in the at least one communication path is performed based, at least in part, on that determined minimum amount of time.

7. A method as set forth in claim 6, wherein the second and third information signals each include information packets, and wherein the information packets of the second information signals are substantially larger in size than the information packets of the first information signals.

8. A method as set forth in claim 6, wherein each second information signal includes error-provoking information, and wherein each third signal is an error signal that is transmitted by the second node in response to that second node receiving a corresponding one of the second signals including the error-provoking information.

9. A method as set forth in claim 8, wherein each third signal is an Internet Control Message Protocol (ICMP) message.

10. A method as set forth in claim 1, further comprising a step of presenting, to a user, information indicating the determined amount of bandwidth available in the at least one communication path.

11. A method for determining an amount of bandwidth available in at least one communication path coupling a plurality of nodes together, the method comprising the steps of:

exercising a first, smaller portion of the at least one communication path that includes a first one of the plurality of nodes, using first information signals, to determine an amount of signal propagation delay present in the first node;

exercising a second, larger portion of the at least one communication path that includes the first node and a second one of the plurality of nodes, using second information signals, to determine an amount of time it takes for at least one of the second information signals to traverse the second, larger portion of the at least one communication path in at least one direction, determining an amount of bandwidth available in at least a portion of the at least one communication path, based on the determine amount of time and the determined amount of propagation delay, wherein the step of exercising the second, larger portion of the at least one communication path using the second information signals includes the steps of:

forwarding at least one second information signal from a test node through the second, larger portion of the communication path to the second node, to cause that second node to transmit at least one third information signal back to the test node through the second, larger portion of the at least one communication path; and determining a minimum amount of time taken for the at least one third information signal to arrive at the test node, relative to a time when the at least one second information signal was forwarded from the test node, wherein the step of determining the amount of bandwidth available in the at least one communication path is performed based, at least in part, on that determined minimum amount of time; and wherein the step of determining the amount of bandwidth available in the at least one communication path is performed by executing a predetermined algorithm which is defined as follows:

$$BW_{POP\text{-}CPE}=(PS)/RTT_{T\text{-}CPE}-((PS)/BW_{T\text{-}POP})-2*MQD)$$

wherein $BW_{POP\text{-}CPE}$ represents the amount of bandwidth available in at least a portion of the at least one communication path, $RTT_{T\text{-}CPE}$ represents the minimum the amount of time taken for the at least one third information signal to arrive at the test node, relative to the time when the at least one second information signal was forwarded from the test node, (PS) represents a predetermined size of an individual one of the second information signals, $BW_{T\text{-}POP}$ represents a predetermined bandwidth provided between the test node and the first node, and MQD represents a predetermined minimum queuing delay present in the first node.

12. A method for determining an amount of bandwidth available in at least one communication path coupling a plurality of nodes together, the method comprising the steps of:

exercising a first, smaller portion of the at least one communication path that includes a first one of the plurality of nodes, using first information signals, to determine an amount of signal propagation delay present in the first node;

exercising a second, larger portion of the at least one communication path that includes the first node and a second one of the plurality of nodes, using second information signals, to determine an amount of time it takes for at least one of the second information signals to traverse the second, larger portion of the at least one communication path in at least one direction;

determining an amount of bandwidth available in at least a portion of the at least one communication path, based on the determined amount of time and the determined amount of propagation delay;

wherein the step of exercising the second, larger portion of the at least one communication path using the second information signals includes the steps of:

forwarding at least one second information signal from a test node through the second, larger portion of the communication path to the second node, to cause that second node to transmit at least one third information signal back to the test node through the second, larger portion of the at least one communication path; and determining a minimum amount of time taken for the at least one third information signal to arrive at the test node, relative to a time when the at least one second information signal was forwarded from the test node, wherein the step of determining the amount of bandwidth available in the at least one communication path is performed based, at least in part, on that determined minimum amount of time, and wherein the second information signals include information specifying a predetermined number of hop counts included in the second, larger portion of the at least one communication path, wherein, during the forwarding step, a step is performed of, reducing the predetermined number of hop counts specified by the information included in each second signal, based on a number of hops included in the second, larger portion of the at least one communication path, and wherein the second node responds to receiving each individual second signal by further reducing the predetermined number of hop counts specified by the information included in that second information signal, and by then transmitting a corresponding third information signal, based on a result obtained by further reducing that predetermined number of hop counts.

13. An apparatus for determining an amount of bandwidth available in at least one communication path coupling a plurality of nodes together, the apparatus comprising:

means for exercising a first, smaller portion of the at least one communication path that includes a first one of the plurality of nodes, using first information signals, to determine an amount of signal propagation delay present in the first node;

means for exercising a second, larger portion of the at least one communication path that includes the first node and a second one of the plurality of nodes, using second information signals, to determine an amount of time it takes for at least one of the second information signals to traverse the second larger portion of the at least one communication path in at least one direction; and means for determining the amount of bandwidth available in at least a portion of the at least one communication path, based on the determined amount of time and the determined propagation delay.

14. An apparatus for determining an amount of bandwidth available in at least one communication path coupling a plurality of nodes together, the apparatus comprising:

a memory storing at least one program;

at least one electronic interface circuit; and a controller coupled to said memory and to the at least one communication path through said electronic interface circuit, said controller operating under the control of the at least one program stored in said memory for performing (a) an exercising operation for exercising a first, smaller portion of the at least one communication path that includes a first one of the plurality of nodes, using first information signals, to determine an amount of signal propagation delay present in the first node, (b) an exercising operation for exercising a second, larger portion of the at least one communication path that includes the first node and a second one of the plurality of nodes, using second information signals, to determine an amount of time it takes for at least one of the second information signals to traverse the second, larger portion of the at least one communication path in at least on direction, and (c) a determining operation of determining the amount of bandwidth available in at least a portion of the at least one communication path, based on the determined amount of time and the determined propagation delay.

15. An apparatus as set forth in claim 14, wherein the first node is located at a Point of Presence, and wherein the bandwidth is in a downlink direction in the at least one communication path, extending from the first node to the second node.

16. An apparatus as set forth in claim 14, wherein said controller also operates under the control of said at least one program stored in said memory by determining the amount of time taken for each individual first information signal to arrive back at said controller from the first node, after being communicated by said controller to the first node, and by determining, based on that amount of time determined for each first information signal, the minimum amount of signal propagation delay experienced by the first information signals while passing through the first node, and wherein said controller performs the second determining operation based on that determined minimum amount of signal propagation delay.

17. An apparatus as set forth in claim 16, wherein the first node includes a router, and the signal propagation delay is caused by a queuing delay in the router.

18. An apparatus as set forth in claim 16, wherein said memory also stores first information representing a size of an individual first information signal and second information representing a predetermined amount of bandwidth provided in the first, smaller portion of the at least one communication path coupled between said electronic interface circuit and the first node, and wherein said controller determines the minimum amount of signal propagation delay based also on at least one of the first and second information stored in said memory.

19. An apparatus as set forth in claim 14, wherein each of the information signals includes an information packet.

20. An apparatus as set forth in claim 14, further comprising at least one user output interface coupled to said controller, wherein said controller also operates under the control of said at least one program stored in said memory for controlling the at least one user interface to cause information indicating the determined amount of available bandwidth to be presented to a user, through that at least one output user interface.

21. An apparatus for determining an amount of bandwidth available in at least one communication path coupling a plurality of nodes together, the apparatus comprising:

a memory storing at least one program;

at least one electronic interface circuit;

a controller coupled to said memory and to the at least one communication path through said electronic interface circuit, said controller operating under the control of the at least one program stored in said memory for performing (a) an exercising operation for exercising a first, smaller portion of the at least one communication path that includes a first one of the plurality of nodes, using first information signals, to determine an amount of signal propagation delay present in the first node, (b) an exercising operation for exercising a second, larger portion of the at least one communication path that includes the first node and a second one of the plurality of nodes, using second information signals, to determine an amount of time it takes for at least one of the second information signals to traverse the second, larger portion of the at least one communication path in at least on direction, and (c) a determining operation of determining the amount of bandwidth available in at least a portion of the at least one communication path, based on the determined amount of time and the determined propagation delay, wherein said controller performs the second determining operation by executing a predetermined algorithm defined as follows:

$$BW_{POP\text{-}CPE}=(PS)/RTT_{T\text{-}CPE}-((PS)/BW_{T\text{-}POP})-2*MQD)$$

wherein $BW_{POP\text{-}CPE}$ represents the amount of bandwidth available in at least a portion of the at least one communication path, $RTT_{T\text{-}CPE}$ represents the minimum the amount of time taken for an error message transmitted by a second one of the nodes, to be received by said controller, relative to a time when an error-provoking second information signal was transmitted by said controller, (PS) represents a predetermined size of an individual one of the second information signals, $BW_{T\text{-}POP}$ represents a predetermined bandwidth provided in the first, smaller portion of the at least one communication path coupled between said electronic interface circuit and the first node, and MQD represents a predetermined minimum queuing delay present in the first node.

22. A program product which includes computer-readable code for executing a method to determine an amount of bandwidth available in at least one communication path coupling a plurality of nodes together, the method comprising the steps of:

exercising a first, smaller portion of the at least one communication path that includes a first one of the plurality of nodes, using first information signals, to determine an amount of signal propagation delay present in the first node;

exercising a second, larger portion of the at least one communication path that includes the first node and a second one of the plurality of nodes, using second information signals, to determine an amount of time it takes for at least one of the second information signals to traverse the second, larger portion of the at least one communication path in at least one direction; and determining the amount of bandwidth available in at least a portion of the at least one communication path, based on the determined amount of time and the determined propagation delay.

23. A program product as set forth in claim 22, wherein the first node is located at a Point of Presence, and wherein the bandwidth is in a downlink direction in the at least one communication path, extending from the first node to the second node.

24. A program product as set forth in claim 22, wherein the step of exercising the first, smaller portion of the at least one communication path includes steps of:

forwarding individual ones of the first information signals from a test node, through the first node, and then back again to the test node, by way of the first, smaller portion of the at least one communication path;

determining the amount of time taken for each individual first information signal to arrive back at the test node, after being forwarded from the test node; and determining a minimum amount of signal propagation delay experienced by the first information signals while passing through the first node, based on the amount of time taken for those first information signals to arrive back at the test node; and wherein the step of determining the amount of bandwidth available in the at least one communication path is performed based, at least in part, on the determined minimum amount of signal propagation delay.

25. A program product as set forth in claim 24, wherein the first node includes a router, and the signal propagation delay is caused by a queuing delay in the router.

26. A program product as set forth in claim 24, wherein the step of determining the minimum amount of signal propagation delay is also performed based on at least one of a size of an individual first information signal and a bandwidth provided in the first, smaller portion of the at least one communication path coupled between the test node and the first node.

27. A program product as set forth in claim 22, wherein the step of exercising the second, larger portion of the at least one communication path using the second information signals includes the steps of:

forwarding at least one second information signal from a test node through the second, larger portion of the at least one communication path to the second node, to cause that second node to transmit at least one third information signal back to the test node through the second, larger portion of the at least one communication path; and determining a minimum amount of time taken for the at least one third information signal to arrive at the test node, relative to a time when the at least one second information signal was forwarded from the test node; and wherein the step of determining the amount of bandwidth available in the at least one communication path is performed based on that determined minimum amount of time.

28. A program product as set forth in claim 27, wherein the second and third information signals each include information packets, and wherein the information packets of the second information signals are substantially larger in size than the information packets of the first information signals.

29. A program product as set forth in claim 27, wherein each second information signal includes error-provoking information, and wherein each third information signal is an error signal that is transmitted by the second node in response to that second node receiving a corresponding second information signal that includes the error-provoking information.

30. A program product as set forth in claim 29, wherein each third information signal is an Internet Control Message Protocol (ICMP) message.

31. A program product as set forth in claim 22, wherein the method further comprises a step of presenting, to a user, information indicating the determined amount of bandwidth available in the communication path.

32. A program product which includes computer-readable code for executing a method to determine an amount of bandwidth available in at least one communication path coupling a plurality of nodes together, the method comprising the steps of:

exercising a first, smaller portion of the at least one communication path that includes a first one of the plurality of nodes, using first information signals to determine an amount of signal propagation delay present in the first node;

exercising a second, larger portion of the at least one communication path that includes the first node and a second one of the plurality of nodes, using second information signals, to determine an amount of time it takes for at least one of the second information signals to traverse the second, larger portion of at least one communication path in at least one direction;

determining the amount of bandwidth available in at least a portion of the at least one communication path, based on the determined amount of time and the determined propagation delay, wherein the step of determining the amount of bandwidth available in the at least one communication path is performed by executing a predetermined algorithm which is defined as follows:

$$BW_{POP\text{-}CPE}=(PS)/RTT_{T\text{-}CPE}-((PS)/BW_{T\text{-}POP})-2*MQD)$$

wherein $BW_{POP\text{-}CPE}$ represents the amount of bandwidth available in at least a portion of the at least one communication path, $RTT_{T\text{-}CPE}$ represents the minimum the amount of time taken for the at least one third information signal to arrive at the test node, relative to a time when the at least one second information signal was forwarded from the test node, (PS) represents a predetermined size of an individual one of the second information signals, $BW_{T\text{-}POP}$ represents a predetermined bandwidth provided between the test node and the first node, and MQD represents a predetermined minimum queuing delay present in the first node.

33. A communication system, comprising:

a plurality of nodes;

at least one communication path coupling the plurality of nodes together; and a test node coupled to a first one of said nodes coupled in said communication path, said test node for exercising a first, smaller portion of the at least one communication path that includes a first one of the plurality of nodes, using first information signals, for determine an amount of signal propagation delay present in the first node, for exercising a second, larger portion of the at least one communication path that includes the first node and a second one of the plurality of nodes, using second information signals, to determine an amount of time it takes for at least one of the second information signals to traverse the second, larger portion of the at least one communication path in at least one direction and for determining an amount of bandwidth available in at least a portion of the communication path, based on the determined amount of time and the determined propagation delay.

34. A communication system as set forth in claim 33, further comprising at least one network interposed in said communication path between the first node and a second one of the plurality of nodes.

35. A communication system as set forth in claim 34, wherein the network operates in accordance with one of Frame Relay (FR) technology and Asynchronous Transfer Mode (ATM) technology.

36. A communication system as set forth in claim 34, wherein the test node is coupled to the first node through the network, and wherein the first node includes a router located at a Point of Presence.

37. A communication system as set forth in claim 34, wherein the second node includes a user communication terminal and the first node includes a router located at a Point of Presence.

38. A communication system as set forth in claim 37, further comprising a multiplexer/demultiplexer device interposed in said communication path between said network and said second node.

39. A communication system as set forth in claim 38, wherein said first node is coupled to the Internet through a further communication path, and wherein the second node is coupled to the Internet through the at least one communication path, said first node, and the further communication path.

40. A communication system as set forth in claim 39, wherein said second node communicates using at least one of Asynchronous Digital Subscriber Line (ADSL) technology, Integrated Services Digital Network (ISDN) technology, and wireless technology.

41. A method for determining an amount of bandwidth available in at least one communication path coupling a plurality of nodes together, the method comprising the steps of:

exercising a first portion of the at least one communication path in which a first one of the nodes is coupled, using first information signals, to determine an amount of time taken for at least one of those first information signals to traverse the first portion of the at least one communication path, in at least one direction;

determining an amount of signal propagation delay experienced by the at least one first information signal while passing through the first node, based on the determined amount of time;

exercising at least a second, larger portion of the at least one communication path, using second information signals, to determine an amount of time taken for at least one of those second information signals to traverse the second portion of the at least one communication path, in at least one direction, wherein the first portion of the at least one communication path forms a portion of the second portion of the at least one communication path; and determining an amount of bandwidth available in at least a portion of the at least one communication path, based on the determined amount of signal propagation delay and the amount of time determined in the step of exercising the second, larger portion of the at least one communication path.

42. A method as set forth in claim 41, wherein the bandwidth is available in a portion of the at least one communication path which does not include the first portion of the at least one communication path.

43. An apparatus for determining an amount of bandwidth available in at least one communication path coupling a plurality of nodes together, the apparatus comprising:

a memory storing at least one program;

at least one electronic interface circuit; and a controller coupled to said memory and to the at least one communication path through said electronic interface circuit, said controller operating under the control of the at least one program stored in said memory for performing (a) a first exercising operation of exercising a first portion of the at least one communication path in which a first one of the nodes is coupled, using first information signals, to determine an amount time taken for at least one of those first information signals to traverse the first portion of the at least one communication path, in at least one direction, (b) a first determining operation to determine an amount of signal propagation delay experienced by the at least one first information signal while passing through the first node, based on the amount of time determined in the first exercising operation, (c) a second exercising operation of exercising a second, larger portion of the at least one communication path, using second information signals, to determine an amount of time taken for at least one of those second information signals to traverse the second portion of the at least one communication path, in at least one direction, and (d) a second determining operation for determining an amount of bandwidth available in at least a portion of the at least one communication path, based on the amount of signal propagation delay determined in the first determining operation and the amount of time determined in the second exercising operation, wherein the first portion of the at least one communication path forms a portion of the second portion of the at least one communication path.

44. An apparatus as set forth in claim 43, wherein the bandwidth is available in a portion of the at least one communication path which does not include the first portion of the at least one communication path.

45. A method for determining at least one bandwidth available in at least one communication path coupling together at least one router and a first node, the method comprising the steps of:

coupling a second, test node to the at least one router;

providing information from the second, test node to the first node, through the at least one router and the at least one communication path;

determining an amount of time taken for the information to be received in the first node;

determining an amount of the information received in the first node; and determining a first bandwidth available in at least a portion of the at least one communication path, based on the determined amount of time and the determined amount of the information received in the first node.

46. A method as set forth in claim 45, wherein the information includes an electronic file.

47. A method as set forth in claim 46, wherein the electronic file has a format in accordance with file transfer protocol RFC 959.

48. A method as set forth in claim 45, wherein the step of determining the amount of time taken for the information to be received in the first node comprises the steps of:

determining a first, earlier time at which a first, beginning portion of the information is received at the first node;

determining a second, later time at which a second, ending portion of the information is received at the first node; and calculating the amount of time taken for the information to be received in the first node, based on the determined first and second times.

49. A method as set forth in claim 48, wherein the step of determining the amount of the information received in the first node includes steps of:

counting a number of bytes included in the information, as the information is being received in the first node, to determine the total number of bytes included in the information; and multiplying the number of bytes counted in the counting step by a predetermined value to determine the total number of bits included in the information.

50. A method as set forth in claim 45, further comprising the steps of:

providing the information from the first node to the second, test node through the at least one communication path and the at least one router;

determining an amount of time taken for the information to be received in the second, test node;

determining an amount of the information received in the second, test node; and determining a second bandwidth available in at least a portion of the at least one communication path, based on that determined amount of time and that determined amount of the information.

51. A method as set forth in claim 50, wherein the step of determining the amount of time taken for the information to be received in the second, test node comprises the steps of:

determining a third, earlier time at which the first, beginning portion of the information is received at the second, test node;

determining a fourth, later time at which the second, ending portion of the information is received at the second, test node; and calculating the amount of time taken for the information to be received in the second, test node, based on the determined third and fourth times.

52. A method as set forth in claim 51, wherein the step of determining the amount of the information received in the second, test node includes steps of:

counting a number of bytes included in the information, as the information is being received in the second, test node, to determine the total number of bytes included in the information; and multiplying the number of bytes counted in that counting step by a predetermined value to determine the total number of bits included in the information.

53. A method as set forth in claim 50, wherein the first bandwidth is available in the at least one communication path in a direction extending from the second, test node to the first node, and wherein the second bandwidth is available in the at least one communication path in a direction extending from the first node to the second, test node.

54. An apparatus for communicating with a node through at least one router and at least one communication path, said apparatus comprising:

a memory storing at least one program;

at least one electronic interface circuit coupled to the at least one router; and a controller coupled to said memory and to the at least one communication path through said electronic interface circuit and the at least one router, said controller operating under the control of the at least one program stored in said memory, and being responsive to receiving information from the node through the at least one communication path, the at least one router, and the at least one electronic interface circuit for (a) determining an amount of time taken for the information to be received in the apparatus, (b) determining an amount of the information received in the apparatus, and (c) determining a bandwidth available in at least a portion of the at least one communication path, based on the determined amount of time and the determined amount of the information.

55. An apparatus as set forth in claim 54, wherein the information is a file having a format in accordance with file transfer protocol RFC 959.

56. An apparatus as set forth in claim 54, wherein the controller is responsive to receiving a first, beginning portion of the information for determining a first, earlier time at which the first, beginning portion of the information is received, said controller also is responsive to receiving a second, ending portion of the information for determining a second, later time at which the second, ending portion of the information is received, and wherein said controller determines the amount of time taken for the information to be received in the apparatus, based on the determined first and second times.

57. An apparatus as set forth in claim 56, wherein the controller responds to receiving each individual byte included in the received information, by counting the byte, to determine the total number of bytes included in the information received in the apparatus, and then multiplies the determined total number of bytes by a predetermined value to obtain the total number of bits included in the information.

58. An apparatus as set forth in claim 54, wherein the controller also operates under the control of the at least one program for forwarding the information received from the node, back to the node, by way of the electronic interface circuit, the at least one router, and the at least one communication path.

59. A program product, for use in a computer coupled to a node through at least one router and at least one communication path, the program product including computer-readable code for executing a method to determine an amount of bandwidth available in the at least one communication path, the method comprising the steps of:

at the computer, detecting the receipt of information forwarded to the computer from the node, through the at least one communication path and the at least one router;

determining an amount of time taken for the information to be received in the computer;

determining an amount of the information received in the computer; and determining a bandwidth available in at least a portion of the at least one communication path, based on the determined amount of time and the determined amount of the information.

60. A program product as set forth in claim 59, wherein the information is a file having a format in accordance with file transfer protocol RFC 959.

61. A program product as set forth in claim 59, wherein the detecting step comprises the steps of:

detecting a first, beginning portion of the information; and detecting a second, ending portion of the information, wherein the step of determining the amount of time taken for the information to be received in the computer comprises the steps of:

determining a first, earlier time at which the first, beginning portion of the information is detected; and determining a second, later time at which the second, ending portion of the information is detected, and wherein the step of calculating the amount of time taken for the information to be received in the computer is performed based on the determined first and second times.

62. A program product as set forth in claim 61, wherein the step of determining the amount of the information includes steps of:

counting each byte included in the information to determine the total number of bytes included in the information; and multiplying the determined total number of bytes by a predetermined value to obtain the total number of bits included in the information.

63. A communication system, comprising:

at least one router;

at least one communication path; and a plurality of nodes coupled together through the at least one communication path and the at least one router, wherein a first one of said plurality of nodes provides information to a second one of the nodes through the at least one communication path and the at least one router, and wherein the first node is responsive to receiving the information for (a) determining an amount of time taken for the information to be received in the first node, (b) determining an amount of the information received in the first node, and (c) determining a first bandwidth available in at least a portion of the at least one communication path, based on the determined amount of time and the determined amount of the information.

64. A communication system as set forth in claim 63, wherein the first node is responsive to determining the first bandwidth for transmitting the information back to the second node through the at least one communication path and the at least one router, and wherein the second node is responsive to receiving that information for (a1) determining an amount of time taken for the information to be received in the second node, (b1) determining an amount of the information received in the second node, and (c1) determining a second bandwidth available in at least a portion of the at least one communication path, based on that determined amount of time and that determined amount of the information.

65. A communication system as set forth in claim 63, wherein the at least one router is located at a Point of Presence of the communication system.

* * * * *